(12) United States Patent
Chimura et al.

(10) Patent No.: US 10,681,918 B2
(45) Date of Patent: Jun. 16, 2020

(54) LOADING SYSTEM FOR BONE-IN LIMB MEAT

(71) Applicant: MAYEKAWA MFG. CO., LTD., Tokyo (JP)

(72) Inventors: Takeshi Chimura, Tokyo (JP); Hiroyuki Usui, Tokyo (JP); Takekuni Umehara, Tokyo (JP); Osamu Goto, Tokyo (JP); Hajime Akabane, Tokyo (JP); Yuuichi Kuratani, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 16/463,098

(22) PCT Filed: Oct. 5, 2018

(86) PCT No.: PCT/JP2018/037378
§ 371 (c)(1),
(2) Date: May 22, 2019

(87) PCT Pub. No.: WO2019/070057
PCT Pub. Date: Apr. 11, 2019

(65) Prior Publication Data
US 2020/0068907 A1    Mar. 5, 2020

(30) Foreign Application Priority Data

Oct. 6, 2017    (JP) .................................. 2017-195872

(51) Int. Cl.
*A22B 7/00*    (2006.01)
*B25J 9/00*    (2006.01)
(Continued)

(52) U.S. Cl.
CPC .............. *A22B 7/005* (2013.01); *B25J 9/0093* (2013.01); *B25J 9/1697* (2013.01); *B25J 11/0045* (2013.01)

(58) Field of Classification Search
CPC ......... A22B 7/001; A22B 7/002; A22B 7/003; A22B 5/00; A22B 5/16
(Continued)

(56) References Cited

U.S. PATENT DOCUMENTS

| 3,376,600 A | 4/1968 | Shadley |
| 6,277,021 B1 | 8/2001 | Meyn |

(Continued)

FOREIGN PATENT DOCUMENTS

| EP | 2174551 A1 | 4/2010 |
| EP | 2277382 A1 | 1/2011 |

(Continued)

OTHER PUBLICATIONS

International Search Report issued in Intl. Appln. No. PCT/JP2018/037378 dated Nov. 13, 2018 English translation provided.
(Continued)

*Primary Examiner* — Richard T Price, Jr.
(74) *Attorney, Agent, or Firm* — Rossi, Kimms & McDowell LLP

(57) ABSTRACT

A loading system for bone-in limb meat according to an embodiment is a loading system for loading a bone-in limb meat to a processing portion, the loading system includes: an image capturing portion for capturing an image of the bone-in limb meat before being loaded to the processing portion; an image processing portion capable of acquiring orientation information of the bone-in thigh meat from the image of the bone-in limb meat captured by the image capturing portion; an openable/closable pair of clamp pieces for holding the bone-in limb meat; an arm supporting the
(Continued)

pair of clamp pieces, and capable of controlling a position and orientation of the pair of clamp pieces; and a control portion controlling, based on the orientation information acquired by the image processing portion, an operation of the arm and thereby holding the bone-in limb meat, and loading the bone-in limb meat to the processing portion.

9 Claims, 20 Drawing Sheets

(51) Int. Cl.
  *B25J 9/16* (2006.01)
  *B25J 11/00* (2006.01)
(58) Field of Classification Search
  USPC ....... 452/125, 128, 149, 150, 153, 177, 183, 452/184
  See application file for complete search history.

(56) References Cited

U.S. PATENT DOCUMENTS

| | | | |
|---|---|---|---|
| 6,779,647 | B1 | 8/2004 | Nagler |
| 7,404,759 | B2 | 7/2008 | Sato |
| 9,004,988 | B2 * | 4/2015 | Van Der Steen ...... A22B 7/002 452/125 |
| 9,179,684 | B2 | 11/2015 | Van Stuyvenberg |
| 9,451,779 | B2 | 9/2016 | Hattori et al. |
| 2009/0238670 | A1 | 9/2009 | Helgi |
| 2012/0231715 | A1 | 9/2012 | Kodama et al. |
| 2012/0315834 | A1 * | 12/2012 | Van Der Steen ...... A22B 5/007 452/125 |
| 2013/0029574 | A1 * | 1/2013 | Van Der Steen ...... A22B 7/003 452/125 |
| 2015/0004892 | A1 * | 1/2015 | Taniguchi ............ A22C 17/004 452/136 |
| 2016/0037787 | A1 * | 2/2016 | Van Der Steen ...... A22B 7/002 452/179 |
| 2019/0373904 | A1 * | 12/2019 | Chimura ................ A22B 7/003 |

FOREIGN PATENT DOCUMENTS

| | | |
|---|---|---|
| GB | 2415944 A | 1/2006 |
| JP | 2001149001 A | 6/2001 |
| JP | 2005304314 A | 11/2005 |
| JP | 2013507101 A | 3/2013 |
| WO | 2007138616 A2 | 12/2007 |
| WO | 2008136513 A1 | 11/2008 |
| WO | 2009139031 A1 | 11/2009 |
| WO | 2014064773 A1 | 5/2014 |

OTHER PUBLICATIONS

Written Opinion issued in Intl. Appln. No. PCT/JP2018/037378 dated Nov. 13, 2018.
International Search Report issued in Intl. Appln. PCT/JP2018/037388 dated Nov. 13, 2018 English translation provided.
Written Opinion issued in Intl. Appln. No. PCT/JP2018/037388 dated Nov. 13, 2018.
International Search Report issued in Intl. Appln. No. PCT/JP2018/037391 dated Nov. 13, 2018. English translation provided.
Written Opinion issued in Intl. Appln. No. PCT/JP2018/037391 dated Nov. 13, 2018.
Copending U.S. Appl. No. 16/463,082, filed May 22, 2019 (a copy is not included because the cited application is not yet available to the public and the Examiner has ready access to the cited application).
Copending U.S. Appl. No. 16/463,108, filed May 22, 2019 (a copy is not included because the cited application is not yet available to the public and the Examiner has ready access to the cited application).
Copending U.S. Appl. No. 16/463,132, filed May 22, 2019 (a copy is not included because the cited application is not yet available to the public and the Examiner has ready access to the cited application).
Notice of Allowance issued in U.S. Appl. No. 16/463,108 dated Jan. 9, 2020.
Extended European Search Report issued in European Appln. No. 18864870.3 dated Jan. 24, 2020.
Notice of Allowance issued in U.S. Appl. No. 16/463,132 dated Mar. 19, 2020.

* cited by examiner $\alpha_3 < \alpha_2$

LOADING SYSTEM FOR BONE-IN LIMB MEAT

TECHNICAL FIELD

The present disclosure relates to a loading system for loading a bone-in limb meat to a processing portion such as a deboner.

BACKGROUND ART

In order to save labor, a process of slaughtering an edible chicken carcass undergoes transition from manual processing to automatic processing by a machine.

Patent Document 1 discloses an automatic deboner which performs a process of deboning a bone-in thigh meat. This deboner intermittently conveys the bone-in thigh meat between a plurality of processing stations while suspending it with a clamping device, and sequentially performs steps of cutting a meat of the bone-in thigh meat, separating bone and meat, and the like in the respective stations, to enable automatic deboning.

Patent Document 2 discloses holding a bone-in thigh meat conveyed by a conveyor by a multi-axes articulated arm and suspending it to a hanger.

CITATION LIST

Patent Literature

Patent Document 1: JP2013-507101 (translation of a PCT application)
Patent Document 2: WO2009/139031A

SUMMARY

Technical Problem

When loading bone-in limb meats such as bone-in thigh meats to an automatic deboner, it is necessary to load a plurality of bone-in limb meats in the same direction so that a processing step for the plurality of bone-in limb meats can be performed uniformly. At present, however, it is difficult to automate, by a machine, a work to load the plurality of bone-in limb meats in the same direction, so it is necessary for person to support to do this work.

Neither Patent Document 1 nor Patent Document 2 discloses a means for automating a work to load a plurality of bone-in limb meats to an automatic deboner or the like in the same direction.

An object of one embodiment is to automate, by a machine without manpower, a work to load a plurality of bone-in limb meats in the same direction when loading the bone-in limb meats to a processing device such as a deboner.

Solution to the Problem (1) A loading system for a bone-in limb meat according to an embodiment is a loading system for loading a bone-in limb meat to a processing portion, the loading system includes: an image capturing portion for capturing an image of the bone-in limb meat before being loaded to the processing portion; an image processing portion capable of acquiring orientation information of the bone-in limb meat from the image of the bone-in limb meat captured by the image capturing portion; a tip tool for holding the bone-in limb meat; an arm supporting the tip tool, and capable of controlling a position and orientation of the tip tool; and a control portion controlling, based on the orientation information acquired by the image processing portion, at least an operation of the arm and thereby holding a limb neck part of the bone-in limb meat, and loading the bone-in limb meat to the processing portion in a predetermined direction.

A "bone-in limb meat" in the present description includes a limb section of an edible chicken carcass such as a thigh section or an arm section. In addition, a "tip tool" includes any configuration capable of holding (and also suspending) the bone-in limb meat, and is not limited to a specific configuration.

With the above configuration (1), it is possible to load a plurality of bone-in limb meats to a processing portion in the same direction by controlling, based on the above orientation information, at least the operation of the arm holding the bone-in limb meat with the tip tool. Thus it is possible to uniformly perform a processing step for the plurality of bone-in limb meats by the processing portion, facilitating automation of a process such as deboning by the processing portion.

(2) In an embodiment, in the above configuration (1), the orientation information includes front/back surface information indicating whether an upper surface of the bone-in limb meat, the image of which is captured by the image capturing portion, is a front surface or a back surface. The control portion is configured to control, based on the orientation information including the front/back surface information, at least the operation of the arm so as to load the bone-in limb meat to the processing portion.

When holding a limb neck part of the bone-in limb meat by the tip tool, the bone-in limb meat is placed on a conveyance surface or the like of, for example, a conveyor. For the sake of convenience, a surface on which the bone-in limb meat is placed at this time will also be referred to as a "holding surface" in the present description. In the bone-in limb meat, in the case of, for example, a bone-in thigh meat of poultry or the like, an inner thigh surface is a front surface, and an outer thigh surface is a back surface.

(3) In an embodiment, in the above configuration (1) or (2), the loading system for the bone-in limb meat further includes: a conveyor conveying the bone-in limb meat to the processing portion. The image capturing portion is configured to capture the image of the bone-in limb meat conveyed by the conveyor.

With the above configuration (3), because the image capturing portion captures the image of the bone-in limb meat conveyed by the above conveyor, image information is obtained by continuously capturing images of a plurality of bone-in limb meats with a single image capturing portion. Thus it is possible to increase a speed at which the plurality of bone-in limb meats are loaded to the processing portion and to improve processing efficiency of the processing portion.

In an embodiment, in the above configuration (3), the plurality of bone-in limb meats are placed on the conveyor with their front surfaces or back surfaces up. The orientation information includes the front/back surface information indicating whether the upper surfaces of the bone-in limb meats, the images of which are captured by the image capturing portion, are the front surfaces or the back surfaces. The control portion is configured to control the operation of the arm based on the orientation information including the front/back surface information, and load the plurality of bone-in limb meats to the processing portion such that one of their front surfaces or back surfaces always face the same direction with respect to the processing portion.

With the above configuration, even if the plurality of bone-in limb meats are randomly placed regardless of their orientations and the front/back surfaces, it is possible to load the plurality of bone-in limb meats to the processing portion with high efficiency such that their front surfaces or back surfaces of the plurality of bone-in limb meats always face the same direction.

In an embodiment, in the above configuration, a plurality of hangers are disposed, the hangers being capable of suspending the bone-in limb meats and conveying the bone-in limb meats to the processing portions. The control portion is configured to control the operation of the arm and respectively suspend the plurality of bone-in limb meats to the plurality of hangers such that one of their front surfaces or back surfaces always face the same direction.

With the above configuration, it is possible to respectively suspend the bone-in limb meats to the plurality of hangers such that one of their front surfaces or back surfaces always face the same direction. Thus it is possible to load the plurality of bone-in limb meats to the processing portion via the hangers such that one of their front surfaces or back surfaces always face the same direction.

(4) In an embodiment, in any one of the above configurations (1) to (3), the loading system only loads one of a right limb or a left limb of the bone-in limb meat to the processing portion.

With the above configuration (4), it is possible to load knee parts in the same direction as well when loading the bone-in limb meats to the processing portion by loading one of the right limbs or left limbs to the processing portion. It is therefore possible to uniformly perform processes in the processing portion, facilitating automation and making it possible to increase a processing speed.

(5) In an embodiment, in any one of the above configurations (1) to (4), the loading system for the bone-in limb meat further includes: a loader portion for receiving the bone-in limb meat from the tip tool and passing the bone-in limb meat to the processing portion. The loader portion includes a rotatable shaft, and three or more hangers being rotatable about the rotatable shaft and disposed at regular angular intervals with respect to the rotatable shaft. With the above configuration (5), when suspending the bone-in limb meat from the tip tool to the hanger of the loader portion, it is possible to simplify the operations of the arm and tip tool by selecting, based on the orientation information of the bone-in limb meat obtained by the image capturing portion, the hanger to suspend. Thus it is possible to increase a suspension speed or increase a loading amount to the processing portion.

(6) In an embodiment, in the above configuration (5), the control portion is configured to perform control so as to suspend the bone-in limb meat from the tip tool to the hanger on a first side with respect to a reference line when the upper surface of the bone-in limb meat, the image of which is captured by the image capturing portion, is the front surface, the reference line connecting the rotatable shaft and a base movably supporting the arm, and suspend the bone-in limb meat from the tip tool to the hanger on a second side with respect to the reference line when the upper surface of the bone-in limb meat, the image of which is captured by the image capturing portion, is the back surface.

With the above configuration (6), the bone-in limb meat is suspended to the hanger at different positions across the above reference line depending on whether the upper surface of the bone-in limb meat is the front surface or the back surface, making it possible to simplify the operations of the arm and the tip tool. Thus it is possible to increase the suspension speed to the hanger or the conveyance amount to the processing portion.

(7) In an embodiment, in any one of the above configurations (1) to (6), the tip tool includes: a base portion supported by the arm; a pair of clamp pieces mounted to the base portion and configured to hold a bone-in limb meat; and an orientation adjusting member for adjusting an orientation of the bone-in limb meat, the orientation adjusting member being mounted to the base portion independently of the pair of clamp pieces and having an inclined surface inclined at an acute angle with respect to a center line between the pair of clamp pieces. When the pair of clamp pieces are in an opened state, in a planar view, at least a part of the inclined surface of the orientation adjusting member is disposed so as to overlap a space formed between the pair of clamp pieces.

In the present description, the "planar view" refers to viewing from a direction perpendicular to a plane including the center line between the above pair of clamp pieces and a direction in which the pair of clamp pieces are opened/closed.

In the above configuration (7), when the pair of clamp pieces are in the closed state, in the planar view, at least the part of the inclined surface of the above orientation adjusting member is disposed so as to overlap a space formed between the pair of clamp pieces. Therefore, when the pair of clamp pieces start to close, the inclined surface first contacts the bone-in limb meat.

When the pair of clamp pieces hold the bone-in limb, thereby raising a part of the bone-in limb meat, positional displacement occurs, in the planar view, between the center of a held section of the bone-in limb meat and the gravity center of the bone-in limb meat.

Owing to this positional displacement, when the bone-in limb meat is further pulled up from the holding surface, a rotational moment is generated, by which the gravity center of the bone-in limb meat shifts to the outside of the held section with the held section as the center. As a result, the held section of the bone-in limb meat comes around to the back of the pair of clamp pieces with the inclined surface of the orientation adjusting member as the center and is held by the clamp pieces in a direction in which the gravity center of the bone-in limb meat is positioned outside of the held section. Therefore, the plurality of bone-in limb meats sequentially held by the pair of clamp pieces are all held in this direction, making it possible to load the plurality of bone-in limb meats to the processing portion in the same direction.

(8) In an embodiment, in any one of the above configurations (1) to (6), the tip tool includes: a pair of clamp pieces including a first clamp piece and a second clamp piece, and being openable/closable so as to hold a bone-in limb meat; and a rotation suppressing portion for suppressing a rotation of the bone-in limb meat, the rotation suppressing portion being disposed at a position deviated with respect to the pair of clamp pieces in a direction perpendicular to a plane including an opening/closing direction of the pair of clamp pieces. The rotation suppressing portion includes a projection portion disposed so as to protrude from the first clamp piece into a space between the pair of clamp pieces and configured to contact the bone-in limb meat when viewed from the direction perpendicular to the plane.

With the above arrangement (8), when the above pair of clamp pieces are closed in order to hold the bone-in limb, the above projection portion protrudes toward the bone-in limb meat and digs into the bone-in limb meat, and thus can fix the bone-in limb meat so as to resist movement thereof. The projection portion is disposed at a position deviated with respect to the pair of clamp pieces in the direction perpendicular to the plane including the opening/closing direction of the pair of clamp pieces, and thus can fix the bone-in limb meat in cooperation with the pair of clamp pieces. Thus it is possible to stably fix the bone-in limb meat.

Thus it is possible to load the bone-in limb meat to the processing portion in a desired direction by operating the pair of clamp pieces holding the bone-in limb meat at a desired position and orientation. It is also possible to load the plurality of bone-in limb meats to the processing portion in the same direction by sequentially holding the plurality of bone-in limb meats with the pair of clamp pieces.

(9) In an embodiment, in any one of the above configurations (1) to (6), the tip tool includes: a pair of clamp pieces for holding a bone-in limb meat; a support portion openably/closably supporting the pair of clamp pieces at respective base portions of the clamp pieces; and rotation suppressing portions for suppressing a rotation of the bone-in limb meat, the rotation suppressing portions being respectively disposed so as to protrude from surfaces of the pair of clamp pieces along a direction perpendicular to a plane including opening/closing directions of the pair of clamp pieces. In an opened state of the pair of clamp pieces, the pair of clamp pieces respectively have tip portions at positions closer to a center line between the pair of clamp pieces than the rotation suppressing portions and positions farther away from the support portion than the rotation suppressing portions in a direction along the center line.

With the above configuration (9), when holding the bone-in limb meat by the pair of clamp pieces, it is possible to suppress the rotation and wobble in the bone-in limb meat by the above rotation suppressing portions, thereby fixing the bone-in limb meat to a clamping position. In addition, because the tip portions of the clamp pieces are inside (a side of the above center line) of the rotation suppressing portions and closer to the tip side than the rotation suppressing portion (a far side from the above support portion), at the start of a holding operation, the tip portions of the clamp pieces first touch the bone-in limb meat, are inserted under the bone-in limb meat, and then pick up the bone-in limb meat. With this operation, it is possible to securely hold the bone-in limb meat by the pair of clamp pieces. It also allows stable holding, making it possible to accelerate the operation of the clamp pieces.

Furthermore, it is possible to suspend the bone-in limb meat to the hanger in a desired direction or load the bone-in limb meat to the processing portion such as a deboner via the hanger by mounting the above support portion to the arm capable of position control and orientation control, and controlling a clamping device holding the bone-in limb meat to a desired position and orientation.

Advantageous Effects

According to an embodiment, it is possible to automate, by the machine without manpower, a work to load a plurality of bone-in limb meats in the same direction when loading bone-in limb meats to a processing portion such as a deboner. It is also possible to align the bone-in limb meats in the same direction, and thus to suppress the moving amount of an arm. Thus it is possible to use a plurality of arms, and to correspond to a processing speed of an automatic deboning machine operating at a high speed. It also becomes possible to simplify the structure of a tip tool, and thus to improve maintainability and system halt due to a failure.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
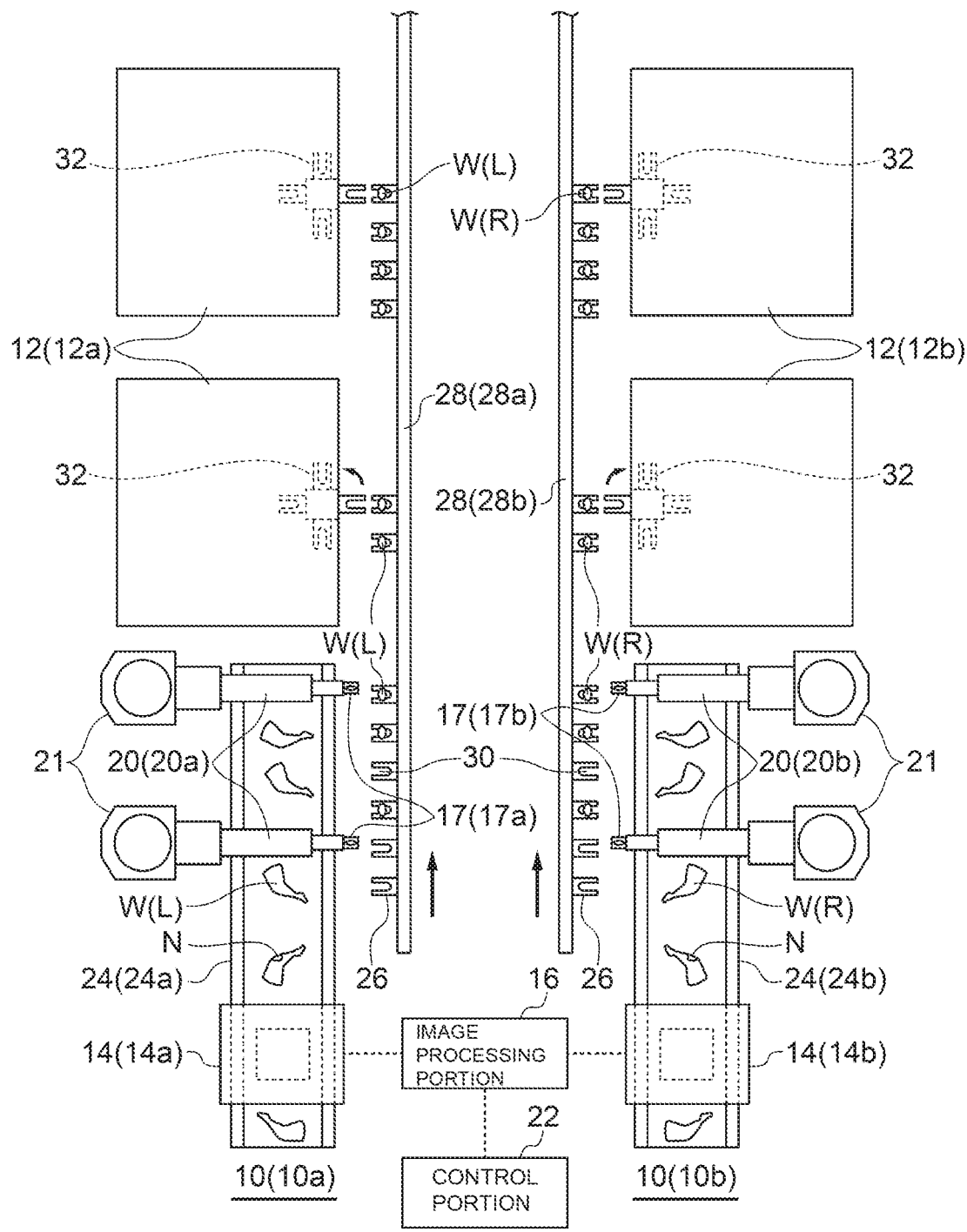
FIG. 1 is an overall configuration diagram of a loading system according to an embodiment.
Figure 2:
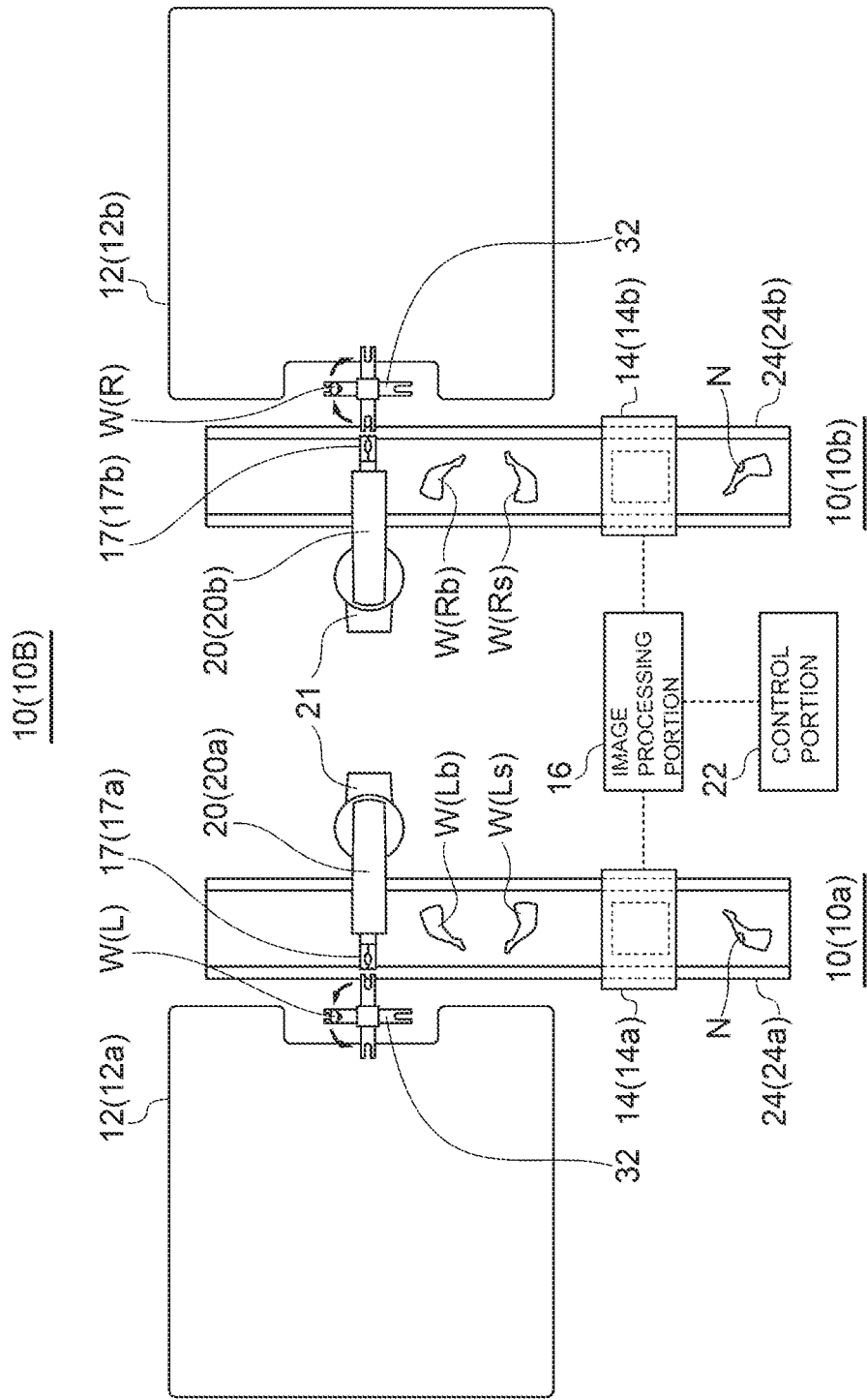
FIG. 2 is an overall configuration diagram of a loading system according to an embodiment.

FIGS. 1 and 2, respectively, show loading systems 10 (10A and 10B) for bone-in limb meats according to an embodiment.

In each of FIGS. 1 and 2, the loading system 10 includes image capturing portions 14 (14a and 14b) for capturing images of bone-in limb meats W (R and L) before being loaded to processing portions 12 (12a and 12b), and an image processing portion 16 capable of acquiring orientation information of the bone-in limb meats W from the images of the bone-in limb meats W captured by the image capturing portions 14.

The loading system 10 also includes arms 20 (20a and 20b) supporting tip tools 17 (17a and 17b) for holding the bone-in limb meats W, and capable of controlling the positions and orientations of the tip tools 17. Based on the orientation information acquired by the image processing portion 16, a control portion 22 controls the operations of the arms 20 and thereby holding limb neck parts of the bone-in limb meats W by the tip tools 17, and loading the bone-in limb meats to the processing portions 12 in a predetermined direction.

With the above configuration, the control portion 22 controls, based on the above orientation information, the operations of the arms 20 holding the bone-in limb meats W with the tip tools 17, making it possible to load a plurality of bone-in limb meats to the processing portions 12 in the same direction. Thus it is possible to uniformly perform a processing step for the plurality of bone-in limb meats by the processing portions 12, facilitating automation of a process such as deboning by the processing portions 12.

It is also possible to align the bone-in limb meats W in the same direction, and thus to suppress the moving amount of the arms 20. Thus, as the loading system 10 (10A) shown in FIG. 1, it is possible to respectively use a plurality of arms for the plurality of processing portions 12, and to correspond to a processing speed of an automatic deboning machine operating at a high speed in a case in which the processing portions 12 are automatic deboning machines.

In addition, in the case of the loading system 10 (10B) using the single arm 20 for the single processing portion 12 like the loading system 10 (10B) shown in FIG. 2, neither suppression of the moving amount of the arm 20 nor a high-speed operation is required. Thus it is possible to simplify the structure of each tip tool 17, and to improve maintainability and system halt due to a failure.

In an embodiment, each tip tool 17 is formed by a mutually-openable/closable pair of clamp pieces and holds the limb neck part of the bone-in limb meat W from both sides by the pair of clamp pieces.

In an embodiment, each tip tool 17 is formed by a hanger having a recess portion into which the limb neck part can be fitted and fits the limb neck part into the recess portion to suspend.

In an embodiment, when the bone-in limb meats W is bone-in thigh meats of poultry or the like, as shown in FIG. 1, the processing portions 12 include the processing portions 12 (12a) specifically for the left limbs W (L) and the processing portions 12 (12b) specifically for the right limbs W (R). In addition, each loading system 10 includes a left-limb-only line 10 (10a) for supplying the left limbs W (L) to the processing portions 12 (12a) and a right-limb-only line 10 (10b) for supplying the right limbs W (R) to the processing portions 12 (12b).

As in this embodiment, the loading system 10 only loads one of the right limbs or left limbs of the bone-in limb meats W to the processing portions 12, making it possible to load not only the bone-in limb meats W but also knee parts N in the same direction. It is therefore possible to uniformly perform processes in the processing portions 12, facilitating automation and making it possible to increase a processing speed.

When the processing portions 12 are processing portions for both the right limb and left limb, each loading system 10 needs to include only single line for both the right limb and left limb.

In an embodiment, each arm 20 is formed as the multi-axes articulated arm, and can operate so as to set a corresponding one of the tip tools 17 at an arbitrary position and orientation. Further, each processing portion 12 is a deboner which separates the bone-in limb meat W into a bone portion and a meat portion.

In an embodiment, the orientation information obtained by the image processing portion 16 shown in FIGS. 1 and 2 includes front/back surface information indicating whether the upper surfaces of the bone-in limb meats W in images of the bone-in limb meats W are captured by the image capturing portions 14 are front surfaces or back surfaces. The bone-in limb meats W are placed on a holding surface. Based on the orientation information including the front/back surface information, the control portion 22 controls the operations of the arms 20 so as to load the bone-in limb meats W to the processing portions 12 in a predetermined direction.

According to this embodiment, even if a plurality of bone-in limb meats are randomly placed on the holding surface regardless of their orientations and the front/back surfaces, the operations of the arms 20 are controlled based on the orientation information including the front/back surface information, making it possible to load the plurality of bone-in limb meats to the processing portions 12 such that their front surfaces or back surfaces always face the same direction.

In an embodiment, as shown in FIG. 2, conveyors 24 (24a and 24b) conveying the bone-in limb meats W to the processing portions 12 are provided, and the image capturing portions 14 are configured to capture the images of the bone-in limb meats W conveyed by the conveyors 24.

According to this embodiment, because the image capturing portions 14 capture the images of the bone-in limb meats W conveyed by the conveyors 24, it is possible to obtain image information by continuously capturing the images of the plurality of bone-in limb meats with a single image capturing portion. Thus it is possible to increase a speed at which the plurality of bone-in limb meats are loaded to the processing portions 12 and to improve processing efficiency of the processing portions 12.

In an embodiment, as shown in FIGS. 1 and 2, the plurality of bone-in limb meats W are placed on the conveyors 24 with their front surfaces or back surfaces up, and the orientation information includes the front/back surface information indicating whether the upper surfaces of the bone-in limb meats W, the images of which are captured by the image capturing portions 14, are the front surfaces or the back surfaces. The control portion 22 controls the operations of the arms 20 based on the orientation information including the front/back surface information, and loads the plurality of bone-in limb meats W to the processing portions 12 such that one of their front surfaces or back surfaces always face the same direction with respect to the processing portions 12.

In an embodiment, as shown in FIG. 1, a plurality of hangers 26 are mounted to hanger conveyors 28 (28*a* and 28*b*) and configured to be movable to the processing portions 12. The plurality of bone-in limb meats W respectively suspended to the plurality of hangers 26 from the tip tools 17 are moved to the processing portions 12 and loaded to loading portions 32 of the processing portions 12.

In an embodiment, a recess portion 30 is formed in each hanger 26, and a corresponding one of the bone-in limb meats W is suspended with its small diameter portion below the limb neck part being inserted into the recess portion 30.

In an embodiment, as shown in FIGS. 1 and 2, the bone-in limb meats W are, for example, the bone-in thigh meats of poultry or the like, and the left limbs W (L) of the bone-in thigh meats are randomly placed on the conveyor 24 (24*a*) of the left-limb-only line 10 (10*a*) regardless of their orientations and front/back surfaces. In addition, the right limbs W (R) of the bone-in thigh meats are randomly placed on the conveyor 24 (24*b*) of the right-limb-only line 10 (10*b*) regardless of their orientations and front/back surfaces.

Referring to FIG. 2, reference character W (Ls) denotes a left limb of the bone-in thigh meat placed with its front surface up, reference character W (Lb) denotes a left limb of the bone-in thigh meat placed with its back surface up, reference character W (Rs) denotes a right limb of the bone-in thigh meat placed with its front surface up, and reference character W (Lb) denotes a right limb of the bone-in thigh meat placed with its back surface up.

According to this embodiment, the control portion 22 controls the operations of the arms 20 (20*a* and 20*b*) based on the orientation information including the front/back surface information, making it possible to sequentially suspend the plurality of bone-in thigh meats to the plurality of hangers 26 such that their front surfaces or back surfaces always face the same direction in the respective lines 10 (10*a* and 10*b*). Thus it is possible to respectively load the plurality of bone-in thigh meats to the processing portions 12 (12*a* and 12*b*) in the same direction.

In an embodiment, as shown in FIG. 1, the plurality of bone-in thigh meats are suspended to the hangers 26 in a state in which all the knee parts N face the back side of a pair of clamp pieces 18. Consequently, in the loading portions 32 of the processing portions 12 (12*a* and 12*b*), the plurality of bone-in thigh meats are loaded to the loading portions 32 in directions in which the knee parts N face the sides of the loading portions 32.

As in this embodiment, it is possible to load not only the bone-in limb meats W but also the knee parts N in the same direction by loading only one of the right limbs or left limbs of the bone-in limb meats W to the processing portions 12 (12*a*) or the processing portions 12 (12*b*). It is therefore possible to uniformly perform the processes in the processing portions 12, facilitating automation of the processing portions and making it possible to increase the processing speed.

Figure 3:
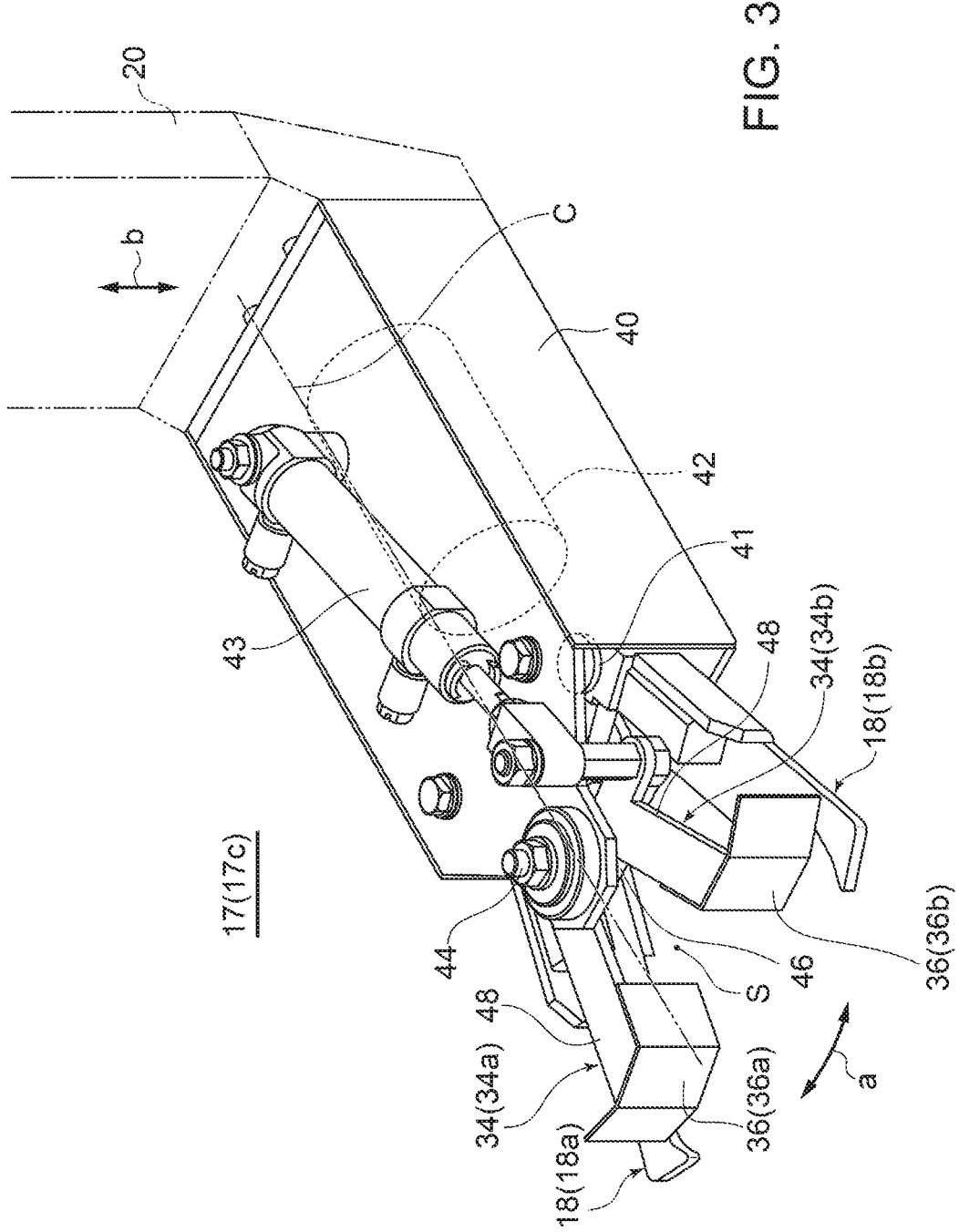
FIG. 3 is a perspective view of a tip tool according to an embodiment.

FIG. 3 shows a tip tool 17 (17*c*) according to an embodiment. The tip tool 17 (17*c*) includes a base portion 40 supported by the arm 20, a pair of clamp pieces 18 (18*a* and 18*b*) mounted to the base portion 40, and orientation adjusting members 34 (34*a* and 34*b*) mounted to the arm 20 independently of the pair of clamp pieces 18. The pair of clamp pieces 18 are configured to be openable and closable so as to be able to hold the limb neck part of the bone-in limb meat W. In order to adjust the orientation of the bone-in limb meat W, the orientation adjusting members 34 have inclined surfaces 36 (36*a* and 36*b*) each inclined at an acute angle with respect to a center line C between the pair of clamp pieces.

When the pair of clamp pieces 18 are in the closed state, in a planar view, at least a part of the inclined surfaces 36 of the orientation adjusting members 34 are disposed so as to overlap a space formed between the pair of clamp pieces.

In the present description, the "planar view" refers to viewing from a direction (the direction of an arrow b) perpendicular to a plane including the center line C between the pair of clamp pieces and a direction in which the pair of clamp pieces are opened/closed.

Figure 4:
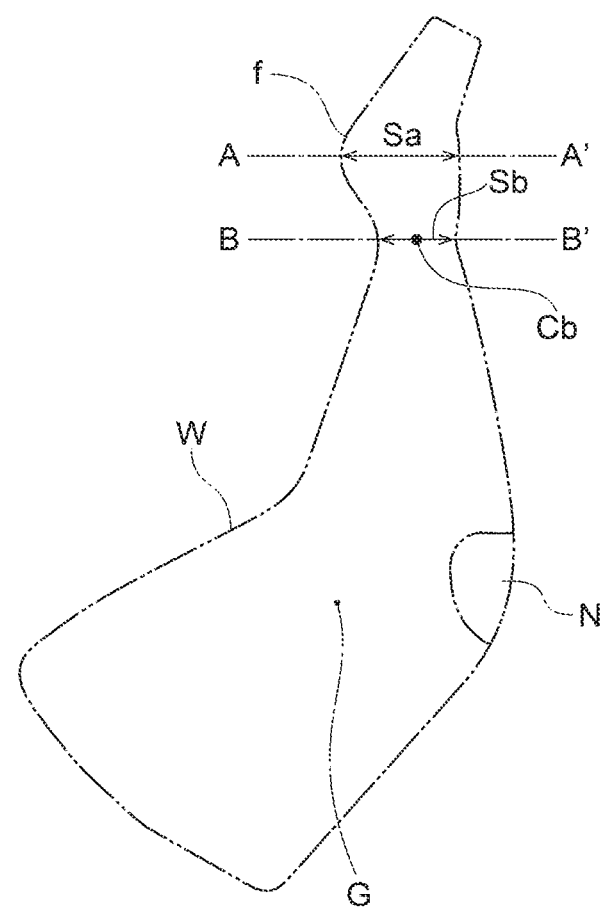
FIG. 4 is a full view showing a bone-in thigh meat as an example of a bone-in limb meat.

FIG. 4 shows a bone-in thigh meat of poultry or the like as an example of the bone-in limb meat W. In FIG. 4, reference character f denotes a limb neck part locked to a hanger or the like when suspended by the hanger. As described below, reference character A-A' denotes a contact position (the maximum diameter portion of the limb neck part f) at which the inclined surfaces 36 contact, and reference character B-B' denotes a holding position (the lower minimum diameter portion of the limb neck part f) held by the pair of clamp pieces 18. Reference character Sa denotes a cross section of the bone-in thigh meat at the contact position A-A', and reference character Sb denotes a cross section of the bone-in thigh meat at the holding position B-B'. Reference character Cb denotes a center of the cross section Sb (to be also referred to as a "holding center" hereinafter). When the bone-in limb meat W is completely suspended by the pair of clamp pieces 18 and drawn away from a holding surface, the holding center Cb and a gravity center G of the bone-in limb meat W match in the planar view. The bone-in limb meat W has the knee part N as a joint part between a thighbone and a lower leg bone.

Figure 5A:
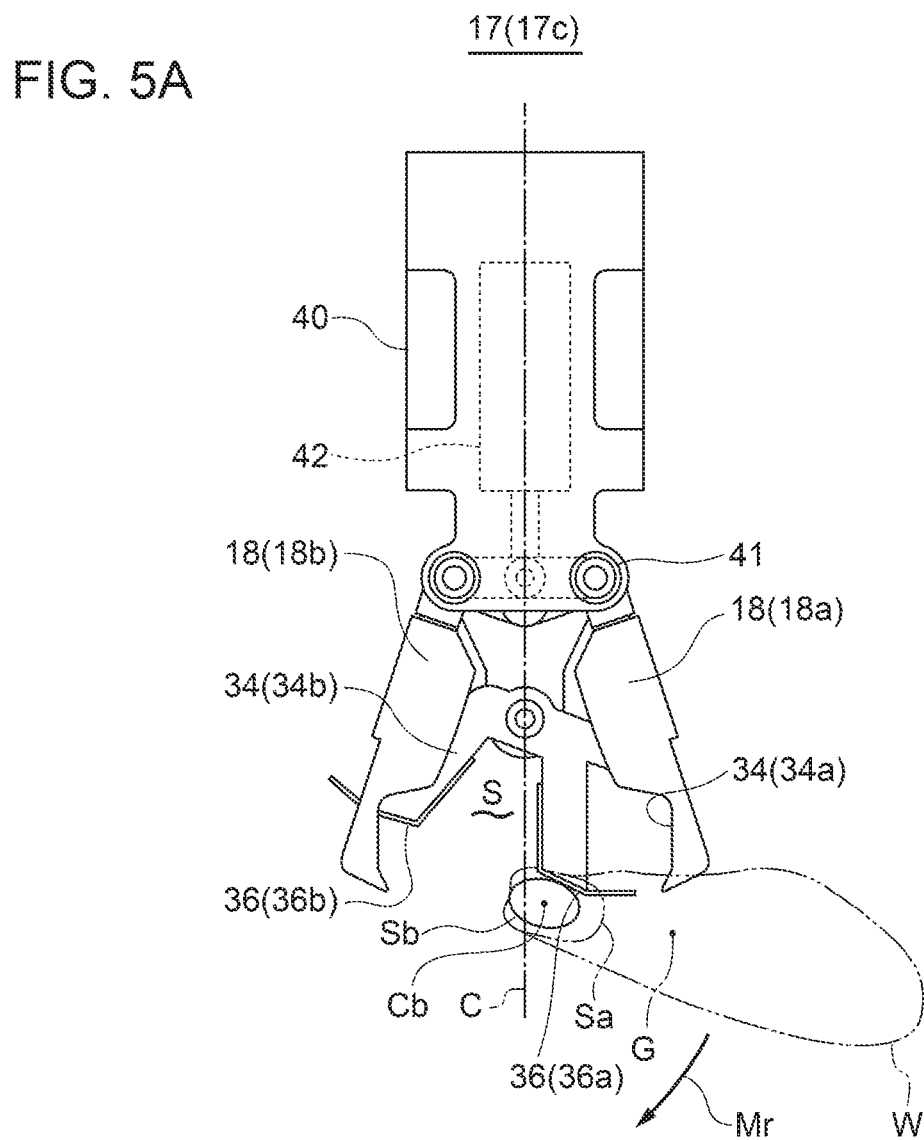
FIG. 5A is a planar view of a tip tool (opened state) according to an embodiment.
Figure 5B:
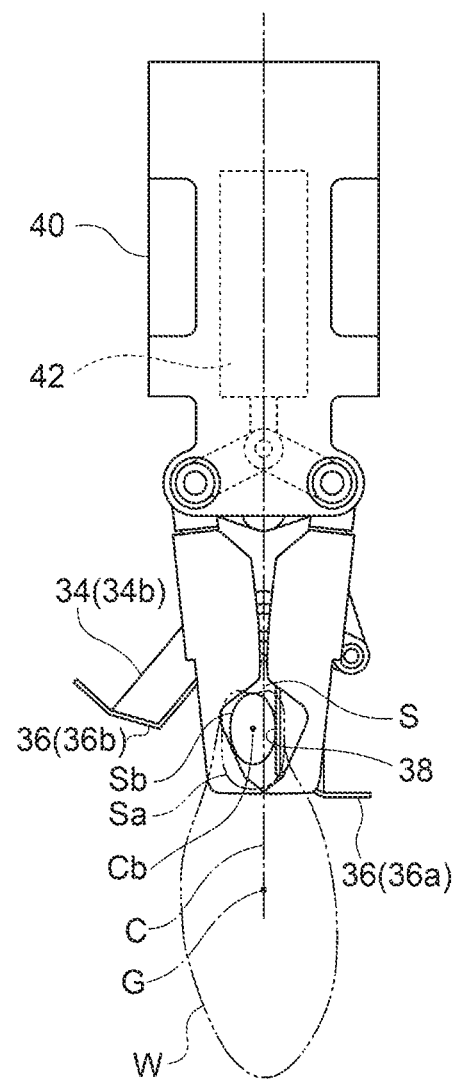
FIG. 5B is a planar view of the tip tool (closed state) according to an embodiment.
Figure 6:
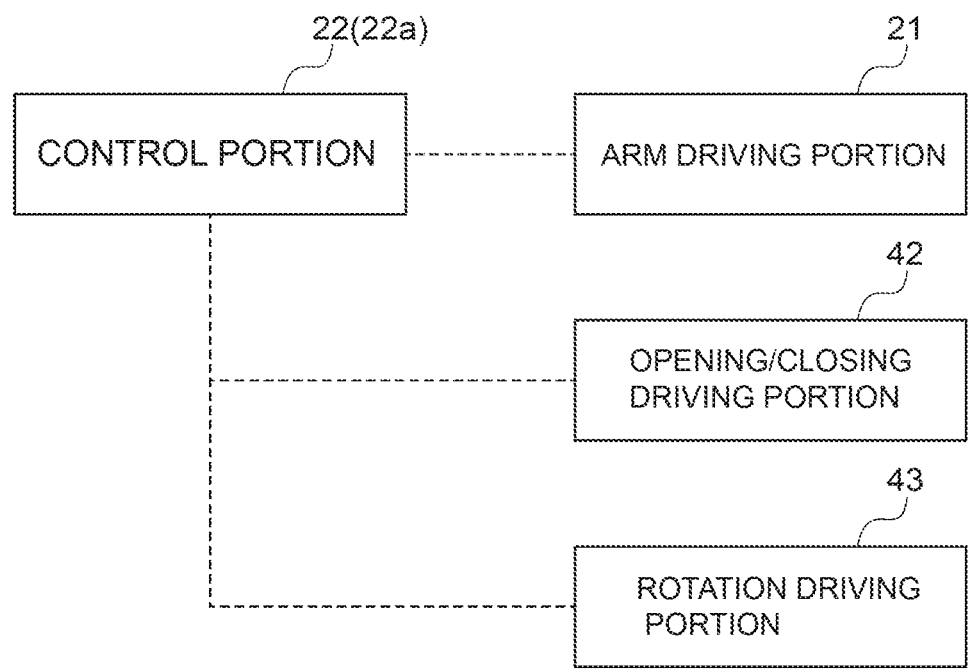
FIG. 6 is a block diagram showing a control system of the loading system according to an embodiment.

FIG. 5A shows a state in which the pair of clamp pieces 18 are opened, and FIG. 5B shows a state in which the pair of clamp pieces 18 are closed. FIG. 6 shows a control system of an embodiment shown in each of FIGS. 3 and 5. Each of FIGS. 7A to 7C and FIGS. 8A to 8C show an operation in which the pair of clamp pieces 18 are closed from an opened state and hold the bone-in limb meat W.

As shown in FIGS. 7A to 7C and FIGS. 8A to 8C, an angle θ forms an acute angle, the angle θ being formed between each of the inclined surfaces 36 (36*a* and 36*b*) and a segment toward a tip side of a corresponding one of the clamp pieces from an intersection between the center line C and an extension line of each of the inclined surfaces 36.

In this embodiment, when the pair of clamp pieces 18 start to close, the inclined surfaces 36 first contact the bone-in limb meat W. When the pair of clamp pieces hold the bone-in limb W, thereby raising a part (limb neck part f) of the bone-in limb meat from the holding surface (for example, the conveyance surface of the conveyor 24), positional displacement exists, in the planar view, between the holding center Cb and the gravity center G of the bone-in limb meat.

Owing to this positional displacement, when the bone-in limb meat is further pulled up from the holding surface, a rotational moment Mr is generated, by which the gravity center G of the bone-in limb meat shifts to the outside of a held section with the holding center Cb as the center. As a result, the held section of the bone-in limb meat comes around to the back of the pair of clamp pieces 18 with the inclined surfaces 36 as the center and is held by the pair of clamp pieces 18 in a direction in which the gravity center G of the bone-in limb meat is positioned outside of the held section. Therefore, the plurality of bone-in limb meats W sequentially held by the pair of clamp pieces are all held in this direction, making it possible to load the plurality of bone-in limb meats to the processing portions 12 in the same direction.

In an embodiment, as shown in FIG. 5B, at the time of a closing operation of the pair of clamp pieces 18, the space S is formed, the space S being capable of loosely fitting the bone-in limb meat W inside the clamp pieces. As a result, a rotational operation of the bone-in limb meat W by the rotational moment Mr is allowed.

Figure 7A:
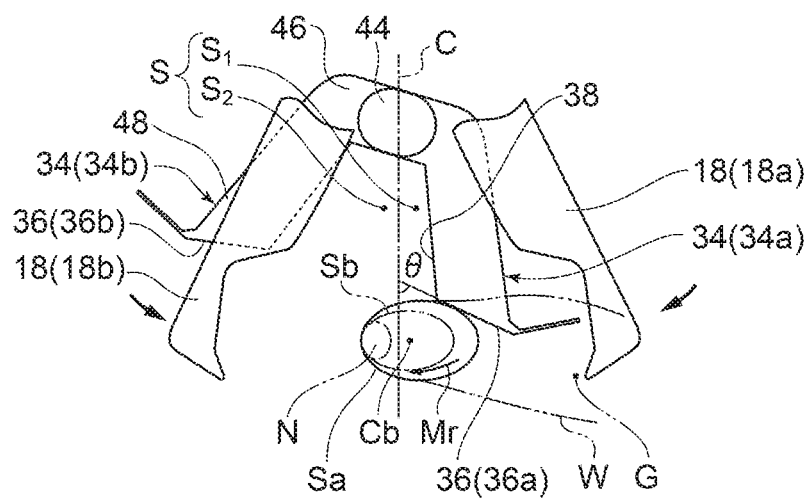
FIG. 7A is an explanatory diagram showing the operation of a tip tool according to an embodiment.
Figure 7B:
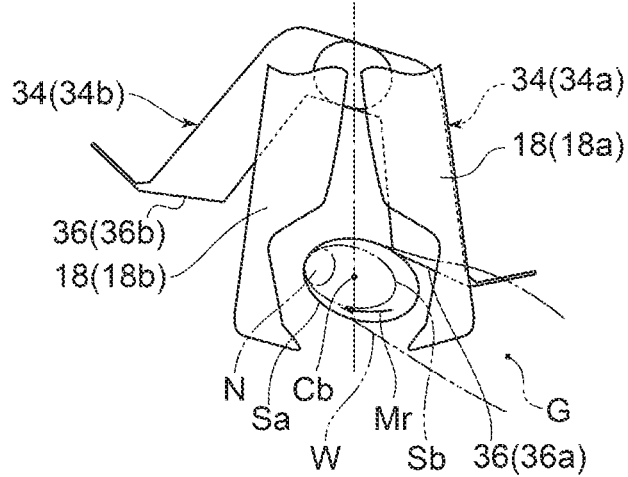
FIG. 7B is an explanatory diagram showing the operation of the tip tool according to an embodiment.
Figure 7C:
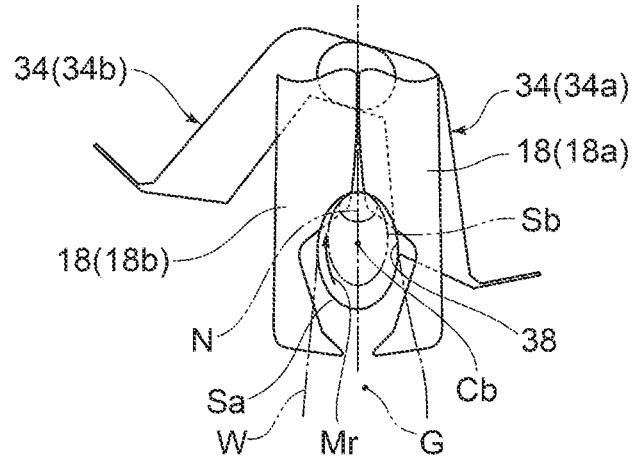
FIG. 7C is an explanatory diagram showing the operation of the tip tool according to an embodiment.
Figure 8A:
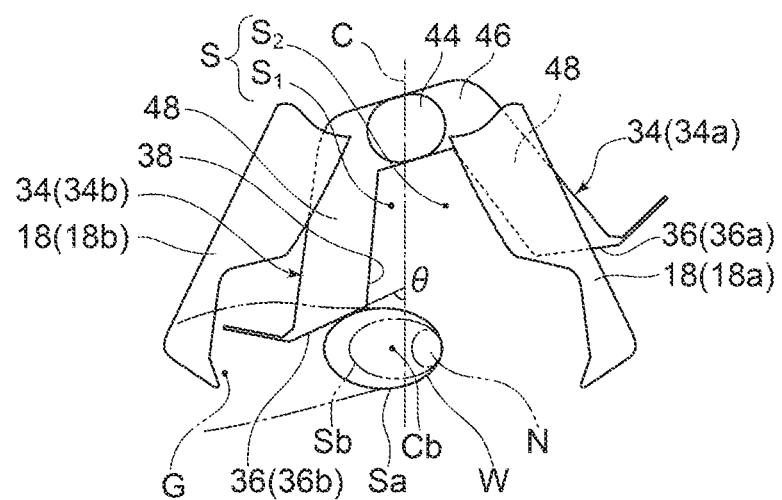
FIG. 8A is an explanatory diagram showing the operation of the tip tool according to an embodiment.
Figure 8B:
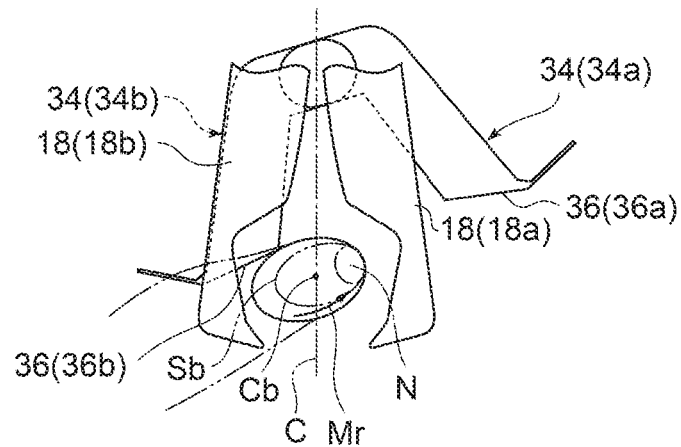
FIG. 8B is an explanatory diagram showing the operation of the tip tool according to an embodiment.
Figure 8C:
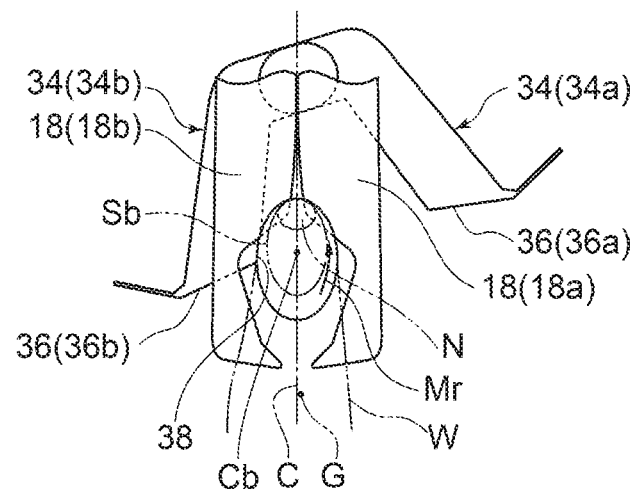
FIG. 8C is an explanatory diagram showing the operation of the tip tool according to an embodiment.

In an embodiment, as shown in FIGS. 5B, 7C, and 8C, when the pair of clamp pieces 18 are in the closed state, the orientation adjusting members 34 have, in a planar view, a restraint surface 38 which exists at a position overlapping the space S. As shown in FIG. 7A, the space S is divided into a first space $S_1$ and a second space $S_2$ by the center line C, the first space $S_1$ being positioned on the side of the orientation adjusting member 34 and the second space $S_2$ being positioned farther away from the orientation adjusting member 34 than the first space $S_1$, and the restraint surface 38 exists at a position overlapping the first space $S_1$ in the planar view.

According to this embodiment, when the pair of clamp pieces 18 are closed, the restraint surface 38 can prevent the bone-in limb meat W from dropping off the pair of clamp pieces 18, making it possible a holding state by the pair of clamp pieces.

In an embodiment, the pair of clamp pieces 18 are rotatably supported to the base portion 40 via a shaft 41 as shown in FIG. 3 and are opened/closed by an opening/closing driving portion 42 built into the base portion 40 as shown in FIG. 5A. The orientation adjusting members 34 are rotatably supported to the base portion 40 via a shaft 44 in an opening/closing direction (direction of an arrow "a" in FIG. 3) of the pair of clamp pieces 18 and are rotated by a rotation driving portion 43. The opening/closing driving portion 42 and the rotation driving portion 43 are constituted of, for example, air cylinders. The base portion 40 is mounted to the arm 20.

As shown in FIG. 6, a control portion 22 (22a) of this embodiment controls arm driving portions 21 driving the arms 20, and controls the opening/closing driving portion 42 and the rotation driving portion 43.

In an embodiment, as shown in FIG. 3, when the pair of clamp pieces 18 are holding the bone-in limb meat W, the inclined surfaces 36 of the orientation adjusting members 34 are positioned above the pair of clamp pieces.

In general, the gravity center G of the bone-in limb meat W exists in a meat part positioned below the holding position of the pair of clamp pieces.

According to this embodiment, the inclined surfaces 36 are positioned above the pair of clamp pieces, making it possible to bring the inclined surfaces 36 into contact with the limb neck part f of the bone-in limb meat W. It is possible to securely generate, in the bone-in limb meat W, the rotational moment Mr centered on the inclined surfaces 36 by bringing the inclined surfaces 36 into contact with the hard limb neck part and setting the hard limb neck part to a rotational center.

In an embodiment, the control portion 22 (22a) controls the rotation driving portion 43 based on the orientation information and the front/back surface information, and rotates the orientation adjusting members 34 such that the inclined surfaces 36 are positioned on the same side as the gravity center G of the bone-in limb meat with respect to the center line C when the pair of clamp pieces 18 hold the bone-in limb meat W.

According to this embodiment, the orientation adjusting members 34 can adjust their directions along the opening/closing direction of the pair of clamp pieces 18 and thus adjust a timing at which the inclined surfaces 36 contact the bone-in limb when the pair of clamp pieces performs a holding operation.

In an embodiment, as shown in FIG. 3, the orientation adjusting members 34 includes a mounting portion 46 mounted to the base portion 40, and a pair of extension portions 48 extending while being forked from the mounting portion 46 and having the inclined surfaces 36.

The control portion 22 (22a) disposes one of the pair of extension portions 48 so as to touch the bone-in limb meat on the holding surface when the upper surface of the bone-in limb meat is the front surface and disposes the other of the pair of extension portions 48 so as to touch the bone-in limb meat when the upper surface of the bone-in limb meat is the back surface.

FIGS. 7A to 7C show the operation of the orientation adjusting members 34 when the bone-in limb meat W is the right limb of the bone-in thigh meat and has the front surface as the upper surface, or when the bone-in limb meat W is the left limb of the bone-in thigh meat and has the back surface as the upper surface.

In this case, the inclined surface 36 (36a) of the orientation adjusting member 34 (34a) contacts the bone-in thigh meat before the clamp piece 18 (18a). The inclined surface 36 (36a) is on the same side as the gravity center G with respect to the holding center Cb, and the rotational moment Mr is generated such that the gravity center G of the bone-in thigh meat rotates, about the inclined surface 36 (36a), to a side closer to the tips of the clamp pieces than the holding center Cb of the pair of clamp pieces. As a result, the bone-in thigh meat is held in a direction in which the knee part N is positioned in the back of the clamp pieces.

FIGS. 8A to 8C show the operation of the orientation adjusting members 34 when the bone-in limb meat W is the right limb of the bone-in thigh meat and has the back surface as the upper surface, or when the bone-in limb meat W is the left limb of the bone-in thigh meat and has the front surface as the upper surface.

In this case, the inclined surface 36 (36b) of the orientation adjusting member 34 (34b) contacts the bone-in thigh meat before the clamp piece 18 (18b). The inclined surface 36 (36b) is on the same side as the gravity center G with respect to the holding center Cb, and the rotational moment Mr is generated such that the gravity center G of the bone-in thigh meat rotates, about the inclined surface 36 (36b), to the side closer to the tips of the clamp pieces than the holding center Cb of the pair of clamp pieces. As a result, the bone-in thigh meat is held in a direction in which the knee part N is positioned in the back of the clamp pieces.

Therefore, when the bone-in limb meat W is the bone-in thigh meat, it is possible to always hold the bone-in thigh meat in the same direction in which the knee part N is positioned in the back of the clamp pieces regardless of whether the bone-in thigh meat has the right limb or the left limb, or the front surface or the back surface as the upper surface. It is therefore possible to always load the plurality of bone-in limb meats W to the processing portions 12 in the same direction.

Figure 9:
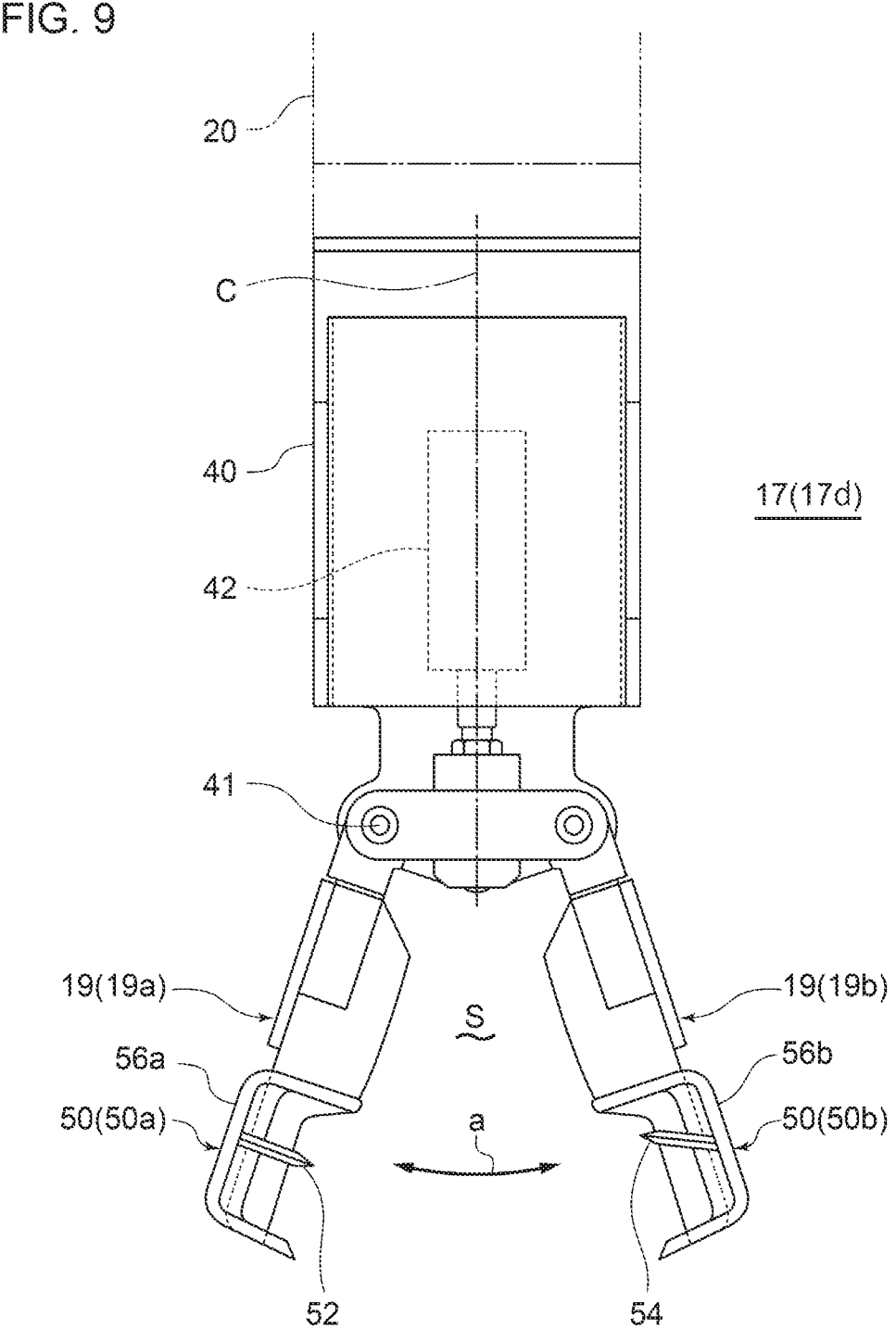
FIG. 9 is a planar view of a tip tool according to an embodiment.
Figure 10:
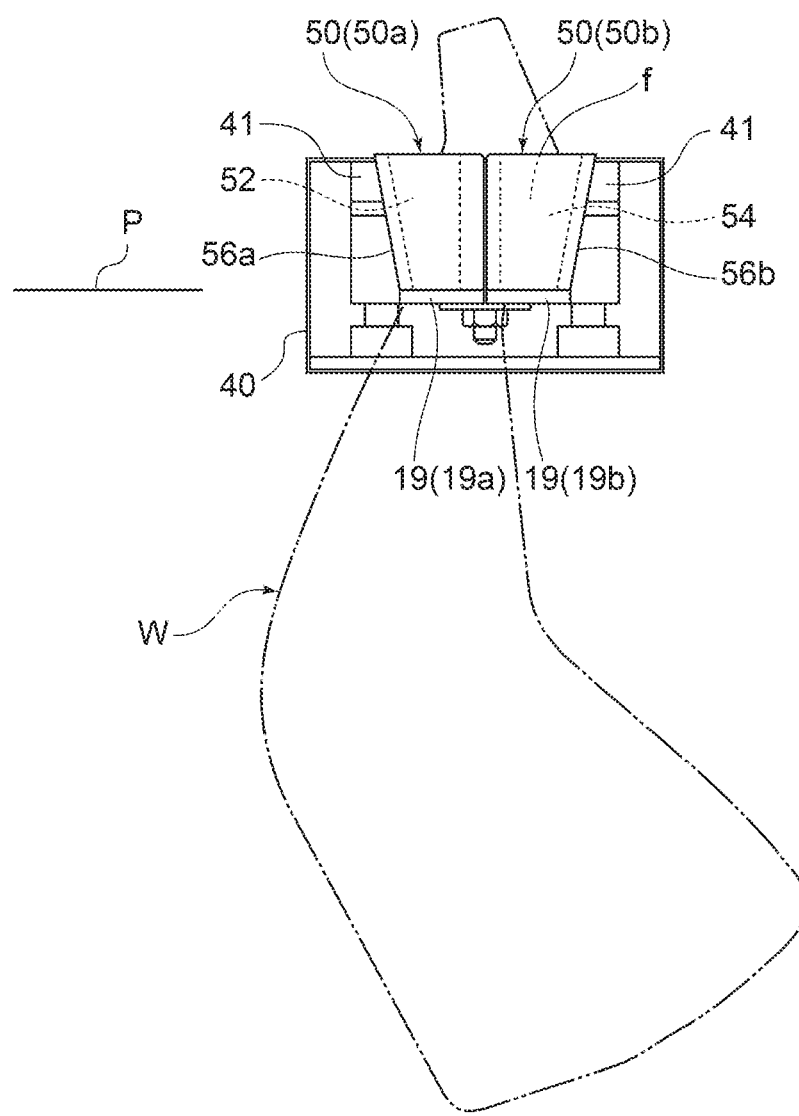
FIG. 10 is a front view of the tip tool according to an embodiment.

FIGS. 9 and 10 show a tip tool 17 (17d) according to an embodiment. The tip tool 17 (17d) includes a pair of clamp pieces 19 (19a and 19b) for holding the bone-in limb meat W, and rotation suppressing portions 50 (50a and 50b) for suppressing a rotation of the bone-in limb meat W when holding the bone-in limb meat W by the pair of clamp pieces 19. The rotation suppressing portions 50 are disposed at positions deviated with respect to the pair of clamp pieces 18 in a direction perpendicular to a plane P including the opening/closing direction of the pair of clamp pieces. In addition, the rotation suppressing portion 50 includes a projection portion 52. When viewed from the direction perpendicular to the plane P, the projection portion 52 is disposed so as to protrude from the first clamp piece 19 (19a) into the space S between the pair of clamp pieces and configured to contact the bone-in limb meat W.

According to this embodiment, when the pair of clamp pieces 19 are closed in order to hold the bone-in limb W, the projection portion 52 protrudes toward the bone-in limb meat and digs into the bone-in limb meat, and thus can fix the bone-in limb meat so as to resist movement thereof. The projection portion 52 is disposed at a position deviated with respect to the pair of clamp pieces 19 in the direction perpendicular to the plane P, and thus can fix the bone-in limb meat W in cooperation with the pair of clamp pieces 19. Thus it is possible to stably fix the bone-in limb meat W.

Thus it is possible to load the bone-in limb meat W to the processing portion 12 in a desired direction by operating, with the arm 20, the pair of clamp pieces 19 holding the bone-in limb meat at a desired position and orientation. It is also possible to load the plurality of bone-in limb meats W to the processing portions 12 in the same direction by sequentially holding the plurality of bone-in limb meats with the pair of clamp pieces 19.

In an embodiment, as shown in FIGS. 9 and 10, the rotation suppressing portion 50 includes an abutting portion 54. The abutting portion 54 is disposed on the side of the second clamp piece 19 (19b) across the center line C with respect to the projection portion 52 and configured to contact the bone-in limb meat W. Moreover, the abutting portion 54 extends oblique to the direction perpendicular to the center line C so as to head for the back of the pair of clamp pieces as it approaches the first clamp piece 19 (19a).

According to this embodiment, when the pair of clamp pieces 19 are closed in order to hold the bone-in limb W, the abutting portion 54 presses the bone-in limb meat in cooperation with the rotation suppressing portion 50. Therefore, when the pair of clamp pieces are closed, the projection portion 52 digs into the bone-in limb meat from the side of the first clamp piece 19 (19a), and the abutting portion 54 presses the bone-in limb meat from the side of the second clamp piece 19 (19b), making it possible to fix the bone-in limb meat W more stably.

In an embodiment, as shown in FIG. 10, the projection portion 52 is formed by a plate-shape body extending along a direction intersecting with the plane P. Accordingly, it is possible to increase a holding force of the projection portion 52 for the bone-in limb meat W.

Figure 11:
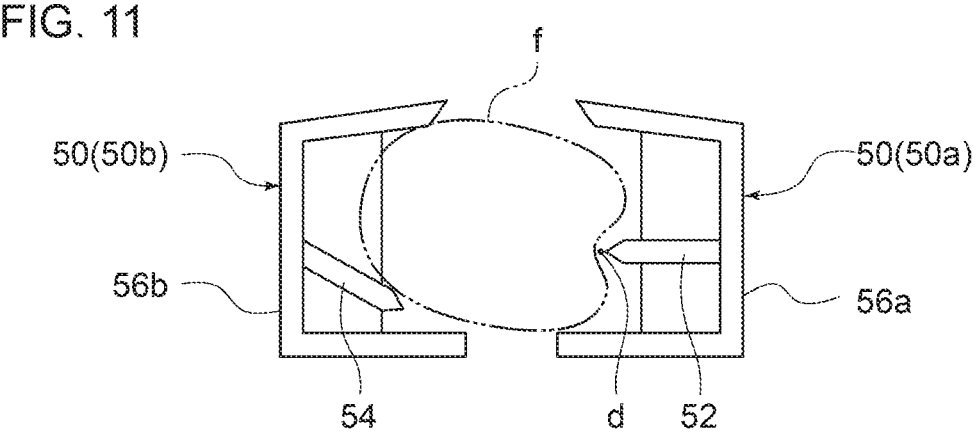
FIG. 11 is an explanatory diagram showing a holding state of the bone-in limb meat by the tip tool according to an embodiment.

Further if the bone-in limb meat W is a bone-in thigh meat of poultry or the like, as shown in FIG. 11, the bone-in thigh meat has a depression d in the limb neck part f along an axial direction. Therefore, when the projection portion 52 is the plate-shape body extending along the direction intersecting with the plane P, the projection portion 52 can be inserted along an extending direction of the depression d, making it possible to further improve the holding force for the bone-in limb meat.

In an embodiment, as shown in FIG. 10, the abutting portion 54 is formed by a plate-shape body extending along the direction intersecting with the plane P.

Thus it is possible to increase an area where the abutting portion 54 contacts the bone-in limb meat W and to increase the holding force for the bone-in limb meat W.

In an embodiment, as shown in FIGS. 9 and 11, the rotation suppressing portions 50 include a first support wall 56a to which the projection portion 52 is fixed and a second support wall 56b to which the abutting portion 54 is fixed. The first support wall 56a and the second support wall 56b extend along the direction intersecting with the plane P and, as shown in FIG. 10, extend in a direction to increase a distance between them upwardly from a suspension direction of the bone-in limb meat W.

With the first support wall 56a and the second support wall 56b, it is possible to increase support strengths of the projection portion 52 and abutting portion 54, and to stably fix the bone-in limb meat W.

In addition, because the first support wall 56a and the second support wall 56b extend in the direction to increase the distance between them upwardly, it becomes easier to accommodate, between the first support wall 56a and the second support wall 56b, the maximum diameter portion of the limb neck part f locked to the pair of clamp pieces 19, making it possible to stably suspend the bone-in limb meat by the pair of clamp pieces 18.

In an embodiment, when viewed from the direction perpendicular to the plane P, the first support wall 56a and the second support wall 56b have U-shapes, the U-shapes each having both ends bent in a direction to face each other, making it possible to improve the strengths of these support walls.

In an embodiment, as shown in FIG. 9, the rotation suppressing portions 50 include a first rotation suppressing portion 50 (50a) and a second rotation suppressing portion 50 (50b). The first rotation suppressing portion includes the first support wall 56a and the projection portion 52, and is fixed to the first clamp piece 19 (19a). The second rotation suppressing portion includes the second support wall 56b and the abutting portion 54, and is fixed to the second clamp piece 19 (19b).

The first rotation suppressing portion and the second rotation suppressing portion can move and perform an opening/closing operation together with an opening/closing operation of the first clamp piece and second clamp piece, and hold the bone-in limb meat W together with the first clamp piece and the second clamp piece.

Figure 12:
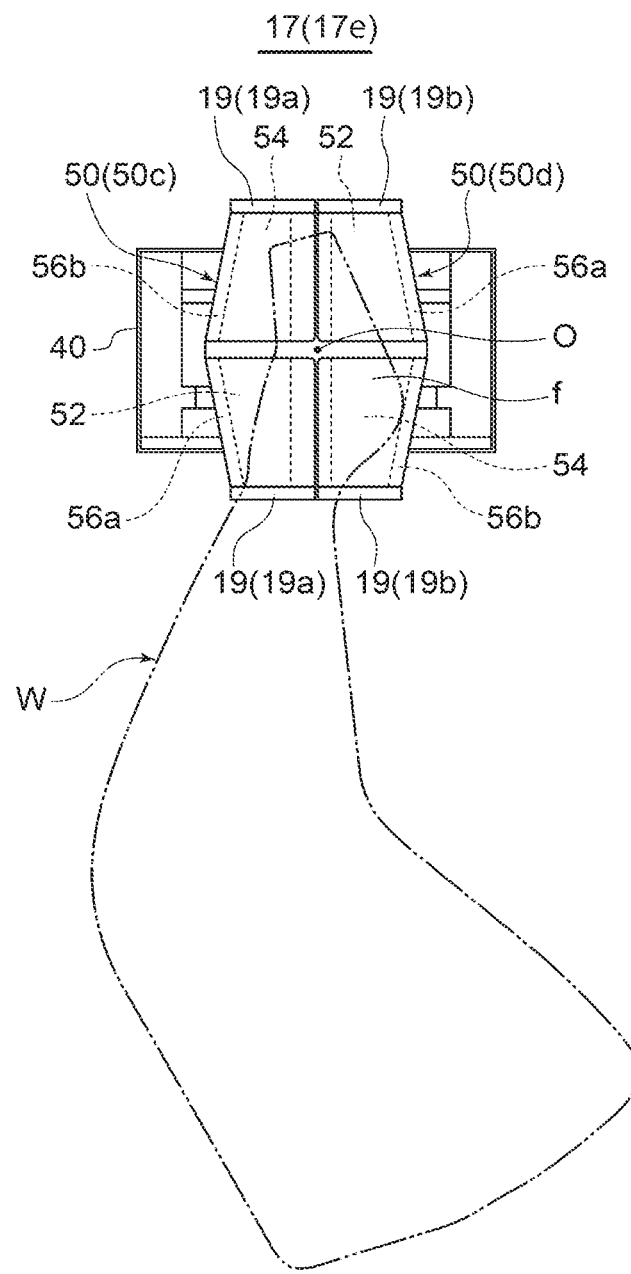
FIG. 12 is a front view of the tip tool according to an embodiment.
Figure 13:
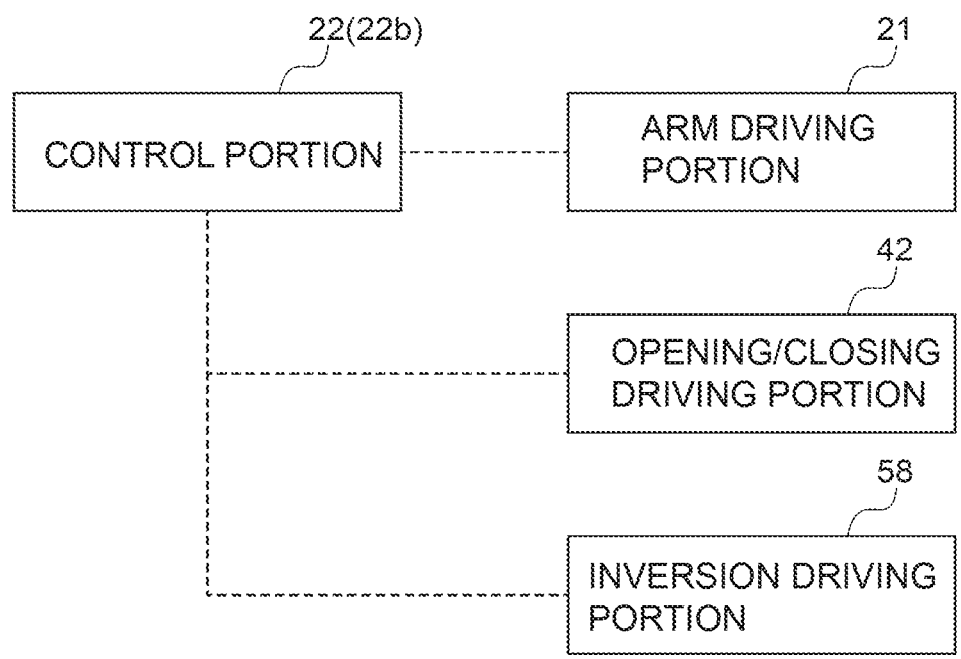
FIG. 13 is a block diagram showing a control system of the loading system according to an embodiment.

FIGS. 12 and 13 show a tip tool 17 (17e) according to an embodiment. Referring to FIG. 12, the pair of clamp pieces 19 and the rotation suppressing portions 50 are mounted to be inverted with respect to the arm 20 with the center line C as the center, and are configured, by being inverted, such that the first clamp pieces 19 (19a) and the second clamp pieces 19 (19b), and the projection portions 52 and the abutting portions 54 can respectively be changed to original positions.

In addition, as shown in FIG. 13, a control portion 22 (22b) according to this embodiment controls the opening/closing driving portion 42 and the arm driving portions 21 driving the arms 20, controls an inversion driving portion 58, and based on the front/back surface information, selects the positions of the first clamp pieces 19 (19a) and projection portions 52, and the second clamp pieces 19 (19b) and abutting portions 54.

According to this embodiment, when the upper surface of the bone-in thigh meat is the front surface or the back surface on the holding surface, the position of the depression d in the limb neck part f are reversed. Even if the position of the depression d is reversed, however, it is possible to touch the depression d with the projection portions 52 by inverting the pair of clamp pieces 19 and the rotation suppressing portions 50.

In an embodiment, as shown in FIG. 2, the plurality of bone-in limb meats W are carried to the arms 20 by the conveyors 24 or the like. In a case in which the bone-in limb meats are the bone-in thigh meats, and the bone-in thigh meats are randomly placed on the conveyors, the upper surface of each bone-in thigh meat is one of the front surface (inner thigh surface) or the back surface (outer thigh surface). When the upper surface of the bone-in thigh meat is the front surface or the back surface on the holding surface where the bone-in thigh meat is placed, the position of the depression d in the limb neck part f is reversed depending on whether the upper surface is the front surface or the back surface.

According to this embodiment, even if the depression d is at the reverse position, it is possible to touch the depression d with the projection portion 52 by inverting the pair of clamp pieces 19 and the rotation suppressing portions 50.

In an embodiment, as shown in FIG. 12, a first rotation suppressing portion 50 (50c) and a second rotation suppressing portion 50 (50d) are formed integrally with the first support walls 56a including the projection portions 52 and the second support walls 56b including the abutting portions 54, respectively. The respective first clamp pieces 19 (19a) are disposed to the upper and lower ends of the first rotation suppressing portion 50 (50c), and the respective second clamp pieces 19 (19b) are disposed to the upper and lower ends of the second rotation suppressing portion 50 (50d).

The pair of clamp pieces 19 and the rotation suppressing portions 50 are configured to be inverted by 180° with respect to the base portion 40 with a center point O as the center, and are configured, by being inverted by 180°, such that the first clamp piece 19 (19a) and the second clamp piece 19 (19b), and the projection portion 52 and the abutting portion 54 can respectively be changed to the original positions.

The center point O is at a position overlapping the center line C when viewed form the direction perpendicular to the plane P, and is positioned on a boundary between the first support walls 56a and the second support walls 56b.

The first rotation suppressing portion 50 (50c) is fixed to the first clamp pieces 19 (19a), and the second rotation suppressing portion 50 (50d) is fixed to the second clamp pieces 19 (19b).

As shown in FIG. 12, the bone-in limb meat W is suspended to the pair of clamp pieces 19 (19a and 19b) on a lower side.

According to this embodiment, the projection portion 52 of the first rotation suppressing portion 50 (50c) can be disposed, by being inverted by 180°, at a position where the projection portion 52 of the second rotation suppressing portion 50 (50d) has existed, and the abutting portion 54 of the first rotation suppressing portion can be disposed, by being inverted by 180°, at a position where the abutting portion 54 of the second rotation suppressing portion has existed.

Therefore, even if the depression d is at the reverse position on the front/back surface, it is possible to touch the depression d with the projection portions 52 by inverting the clamp pieces 19 and the rotation suppressing portions 50.

In an embodiment, as shown in FIG. 12, the first support walls 56a and the second support walls 56b of the first rotation suppressing portion 50 (50c) and the second rotation suppressing portion 50 (50d) extend in a direction to decrease a distance between them with distance from the center point O.

The bone-in limb meat W is held in regions of the first support wall 56a and second support wall 56b of the first rotation suppressing portion and the second rotation suppressing portion, the regions being positioned on the lower side of the suspension direction of the bone-in limb meat W. The first support wall and the second support wall holding the bone-in limb meat extend in the direction to increase the distance between them upwardly from the suspension direction of the bone-in limb meat W, making it easier to accommodate, between the first support wall and the second support wall, the maximum diameter portion of the limb neck part f than at the holding position B-B'. Thus it is possible to stably suspend the bone-in limb meat.

Figure 14:
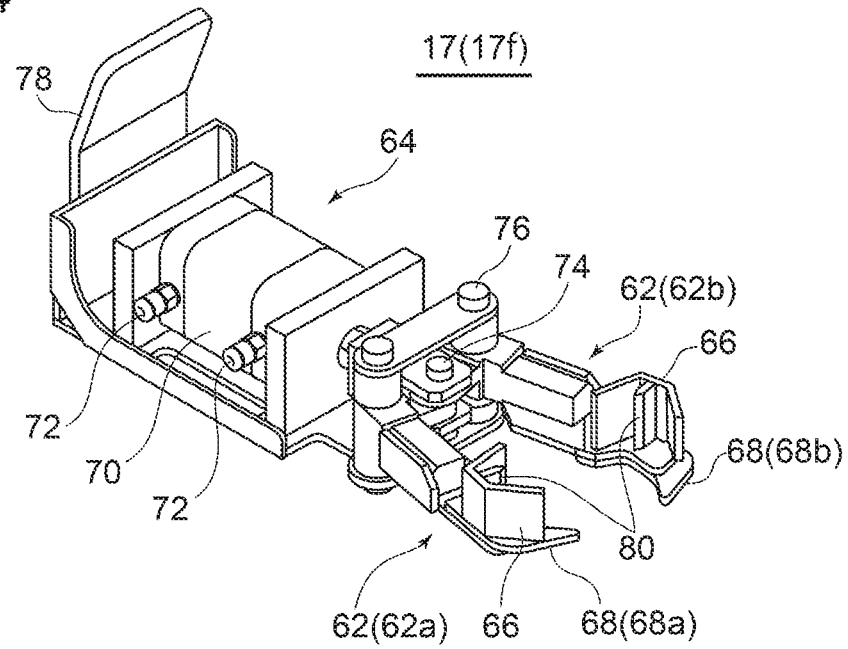
FIG. 14 is a perspective view of a tip tool (opened state) according to an embodiment.
Figure 15:
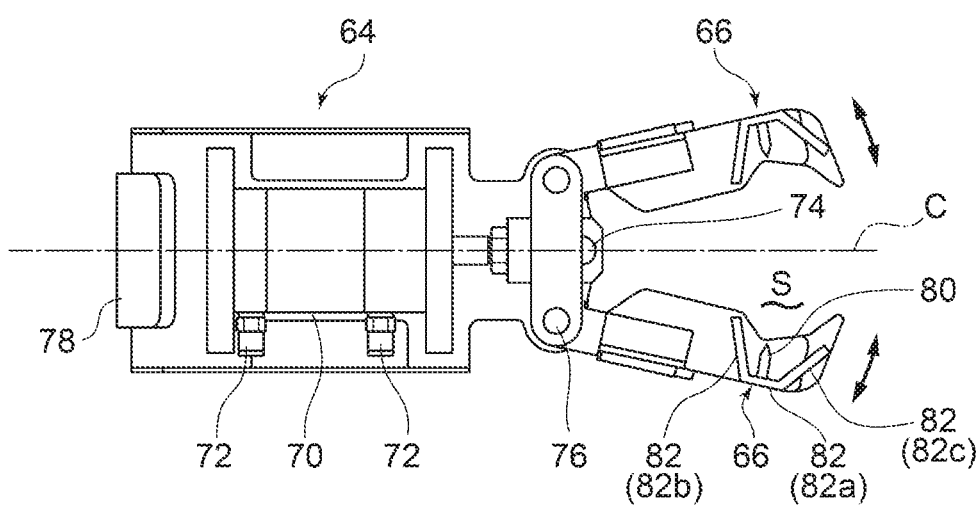
FIG. 15 is a planar view of the tip tool (opened state) according to an embodiment.
Figure 16:
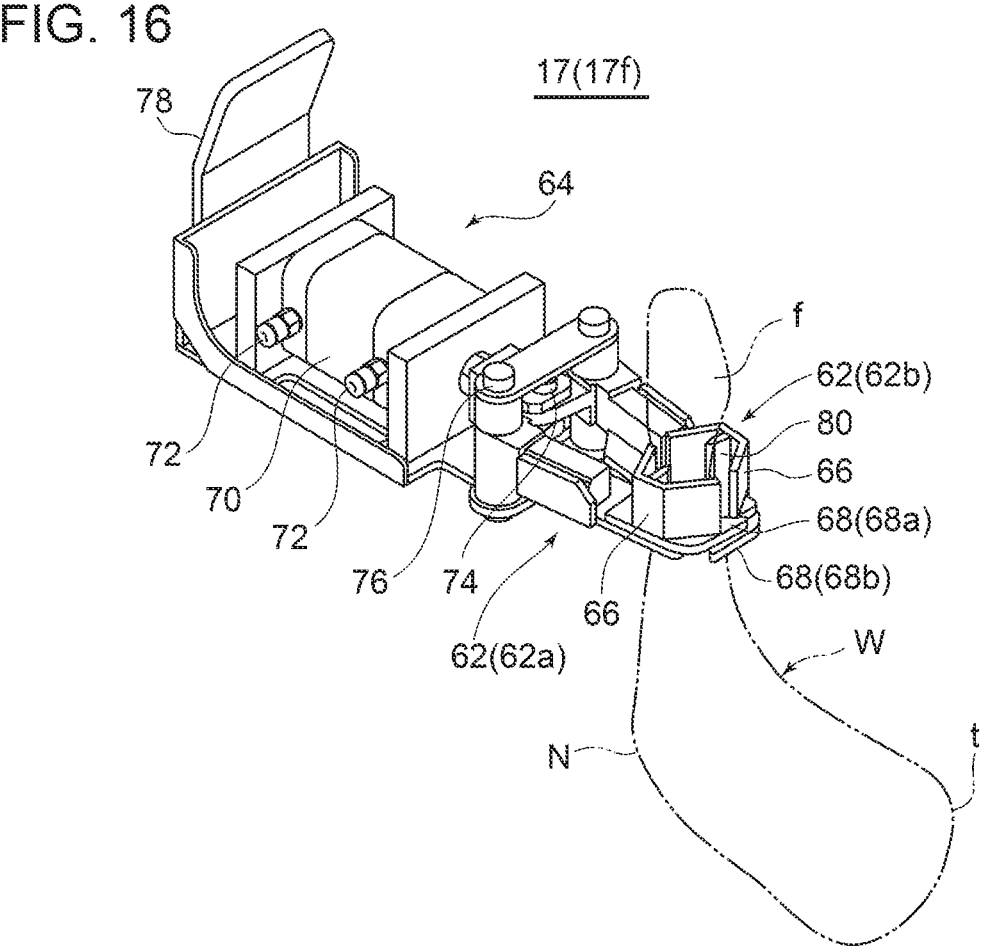
FIG. 16 is a perspective view of the tip tool (closed state) according to an embodiment.
Figure 17:
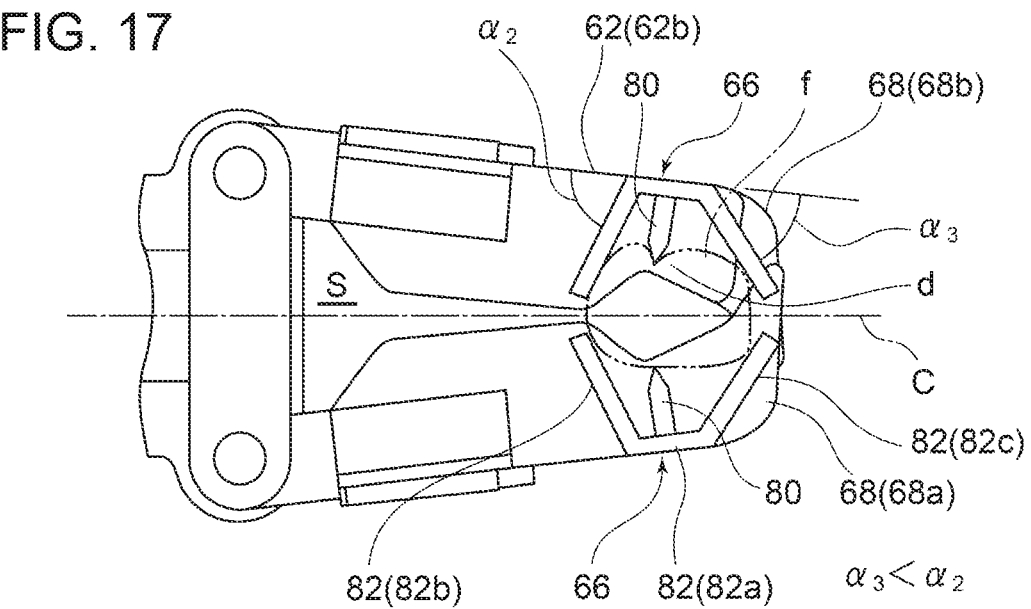
FIG. 17 is a planar view of the tip tool (closed state) according to an embodiment.

Each of FIGS. 14 to 17 shows a tip tool 17 (17f) according to an embodiment. Each of FIGS. 14 and 15 shows an opened state of a pair of clamp pieces 62 (62a and 62b). Each of FIGS. 16 and 17 shows a closed state capable of holding the bone-in limb meat W. The bone-in limb meat W shown in FIG. 16 represents an outline of a poultry bone-in thigh meat. A small diameter portion between a thigh section t and an enlarged diameter portion of the limb neck part f serves as a section held by the pair of clamp pieces 62.

The tip tool 17 (17f) includes the pair of clamp pieces 62, a support portion 64, and rotation suppressing portions 66. The support portion 64 openably/closably supports the pair of clamp pieces 62 in base portions of the pair of clamp pieces 62. The rotation suppressing portions 66 are capable of suppressing a rotation and wobble in the bone-in limb meat W when the bone-in limb meat W is held by the pair of clamp pieces 62. The rotation suppressing portions 16 are disposed so as to protrude from the surfaces of the respective clamp pieces 62 (62a and 62b) along a direction perpendicular to the plane P including opening/closing directions (arrow directions in FIG. 2) of the pair of clamp pieces 62. In the opened state, tip portions 68 (68a and 68b) of the clamp pieces are respectively at positions closer to the center line C between the pair of clamp pieces than the rotation suppressing portions 66, and positions farther away from the support portion 64 than the rotation suppressing portions 66 in a direction along the center line C, that is, positions on a tip side.

With the above configuration, when holding the bone-in limb meat W by the pair of clamp pieces 62, it is possible to suppress the rotation and wobble in the bone-in limb meat W by the rotation suppressing portions 66, thereby fixing the bone-in limb meat W to a clamping position. In addition, because the tip portions 68 of the clamp pieces 62 are inside (the side of the center line C) of the rotation suppressing portions 66 and closer to the tip side than the rotation suppressing portions 66, at the start of a holding operation, the tip portions 68 of the clamp pieces 62 first touch the bone-in limb meat W, are inserted under a clamped section (limb neck part f) of the bone-in limb meat W, and then pick up the clamped section. With this operation, it is possible to securely hold the bone-in limb meat by the pair of clamp pieces 62. It also allows stable holding, making it possible to accelerate the operation of the clamp pieces 62.

Furthermore, it is possible to suspend the bone-in limb meat W to the hanger 26 in a desired direction or load the bone-in limb meat W to the processing portion 12 such as a deboner via the hanger 26 by mounting the support portion 64 to the arm 20 capable of position control and orientation control, and controlling the tip tool 17 (17f) holding the bone-in limb meat W to a desired position and orientation.

In an embodiment, the support portion 64 includes an actuator 70 for opening/closing the pair of clamp pieces 62. For example, the actuator 70 is constituted of a hydraulic cylinder including inlet/outlet ports 72 for working oil and reciprocates a shaft 74 in the direction along the center line C. The pair of clamp pieces 62 are rotatably supported by shafts 76, the shafts 76 rotates by reciprocating motion of the shaft 74, and then the pair of clamp pieces 62 are opened and closed.

Moreover, a mounting plate 78 is disposed on the back surface of the support portion 64, and the support portion 64 is mounted to the multi-axes articulated arm 20 capable of controlling the position and orientation of the support portion 64 via the mounting plate 78.

In an embodiment, the rotation suppressing portions 66 are respectively disposed to the pair of clamp pieces 62 (62a and 62b), and the rotation suppressing portions 66 include contact pieces 80 extending toward the side of the center line C. As shown in FIGS. 16 and 17, the contact pieces 80 are configured to contact the held bone-in limb meat W when the pair of clamp pieces 62 are in the closed state.

According to this embodiment, when holding the bone-in limb meat W by the pair of clamp pieces 62, it is possible to fix the bone-in limb meat W by the contact pieces 80, and thus to prevent the rotation and wobble in the bone-in limb meat W.

In an embodiment, each contact piece 80 is formed by a plate-shape body extending along a direction intersecting with an opening/closing-direction plane. The contact pieces 80 extend along the longitudinal direction of the held limb neck part, making it possible to fix the limb neck part to the clamp pieces more firmly.

FIG. 17 shows a state in which the limb neck part f of a poultry bone-in thigh meat of a chicken or the like serving as the bone-in limb meat W is held by the pair of clamp pieces 62. If the bone-in limb meat W is the poultry bone-in thigh meat, the depression d exists in the limb neck part f in the longitudinal direction. When the contact pieces 80 are the plate-shape bodies extending along the direction intersecting with the opening/closing-direction plane (perpendicular direction in the figure), one of the contact pieces 80 is inserted into the depression d, making it possible to further improve a holding force for the bone-in thigh meat.

In an embodiment, the rotation suppressing portions 66 are formed including wall portions 82 (82a, 82b, and 82c). The wall portions 82 are respectively disposed to the pair of clamp pieces 62 so as to face each other across the space S between the pair of clamp pieces 62. In addition, in the opened state, the tip portions 68 (68a and 68b) of the clamp pieces 62 (62a and 62b) are respectively positioned inside of the wall portions 82 (closer to the center line C) and positioned (on a tip side) farther away from the support portion 64 than the wall portions 82 in the direction along the center line C.

According to this embodiment, it is possible to increase the strength of the clamp pieces 62 by the presence of the wall portions 82, and to allow the rotation suppressing portions 66 to support the bone-in limb meat W picked up by the tip portions 68 of the clamp pieces 62 in an early stage of the holding operation because the wall portions 82 are in the above positional relationship with respect to the tip portions 68. Thus it is possible to securely hold the bone-in limb meat W.

In an embodiment, since the wall portions 82 at least partially extend along outlines on far sides of the clamp pieces 62 (62a and 62b) from the center line C respectively, the wall portions do not get in the way of the holding operation of the clamp pieces 62 but can assist the operation of the clamp pieces 62, thereby preventing the bone-in limb meat W from dropping off the clamp pieces 62.

In an embodiment, the wall portions 82 forming the rotation suppressing portions 66 are constituted of first wall portions 82 (82a), second wall portions 82 (82b), and third wall portions 82 (82c). The first wall portions 82 (82a) extend along the center line C in the closed state of the pair of clamp pieces 62. The second wall portions 82 (82b) are connected to the end portions of the first wall portions 82 (82a) on the side of the support portion 64, and bend and extend from the first wall portions 82 (82a) toward the center line C. The third wall portions 82 (82c) are connected to the end portions of the first wall portions 82 (82a) on an opposite side to the support portion 64, and bend and extend from the first wall portions 82 (82a) toward the center line C. The contact pieces 80 are disposed between the second wall portions 82 (82b) and the third wall portions 82 (82c).

According to this embodiment, the first wall portions 82 (82a), the second wall portions 82 (82b), and the third wall portions 82 (82c) are disposed so as to surround the bone-in limb meat W held by the clamp pieces 62, and thus the first wall portions 82 (82a), the second wall portions 82 (82b), and the third wall portions 82 (82c) enclose the bone-in limb meat W picked up by the tip portions 68 of the clamp pieces 62 in the early stage of the holding operation, making it possible to prevent the bone-in limb meat W from dropping off the tip portions 68, and suppress the rotation and wobble in the held bone-in limb meat W.

In an embodiment, as shown in FIG. 17, the second wall portions 82 (82b) and the third wall portions 82 (82c) are inclined with respect to the center line C in the closed state of the pair of clamp pieces 62, and an inclination angle $\alpha_3$ of the third wall portion 82 (82c) with respect to the center line C is smaller than an inclination angle $\alpha_2$ of the second wall portion 82 (82b) with respect to the center line C ($\alpha_3 < \alpha_2$).

According to this embodiment, when the pair of clamp pieces 62 hold the bone-in limb meat W, the third wall portions 82 (82c) can approach a holding surface even if the clamp pieces 62 are inclined with respect to a work placement surface where the bone-in limb meat W is placed. In this way, it is possible to insert the third wall portions 82 (82c) below the bone-in limb meat W picked up by the tip portions 68 of the clamp pieces 62 and prevent the bone-in limb meat W from dropping off the tip portions 68. Thus it is possible to securely hold the bone-in limb meat W.

Figure 18:
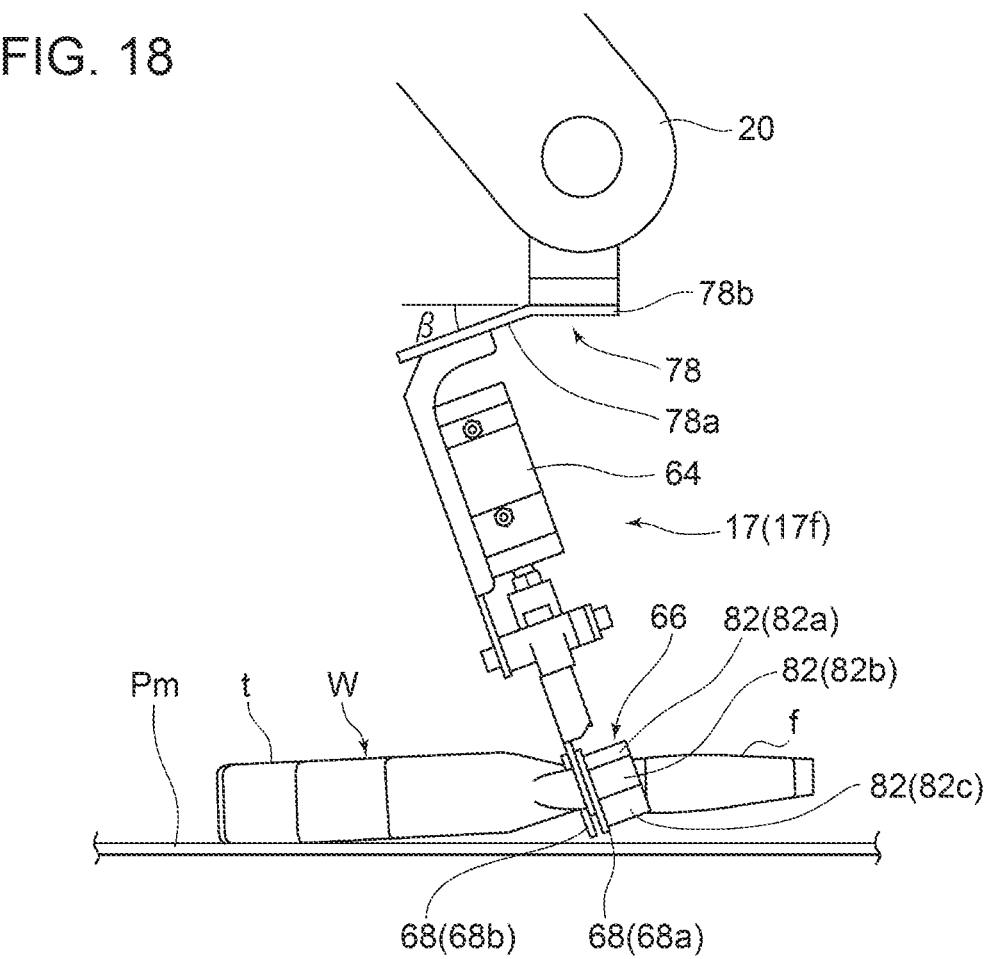
FIG. 18 is an explanatory diagram showing a holding operation of the tip tool according to an embodiment.

FIG. 18 shows a scene in which the tip tool 17 (17f) holds and transports the bone-in limb meat W placed on the holding surface Pm. The tip tool 17 (17f) is mounted on the arm 20 via the mounting plate 78. The arm 20 is formed as the multi-axes articulated arm, and capable of controlling the position and orientation of the tip tool 17 (17f). A clamping-device-side mounting portion 78a of the mounting plate 78 is inclined by an angle β with respect to an arm-side mounting portion 78b. As a result, the clamp pieces 62 are inclined by the angle β with respect to the holding surface Pm. This inclination facilitates an approach operation of the clamping device 10 to the bone-in limb meat W. In addition, the inclination angle $α_2$ of the third wall portion 82 (82c) with respect to the center line C is smaller than the inclination angle $α_3$ of the second wall portion 82 (82b) with respect to the center line C even if the clamp piece 12 is inclined with respect to the holding surface Pm, allowing the third wall portion 82 (82c) to make an inclination angle with respect to the holding surface Pm smaller at the time of the holding operation. It is therefore possible, by the two third wall portions 82 (82c) respectively disposed to the pair of clamp pieces 62, to quickly enclose the bone-in limb meat W picked up by the tip portions 68 of the clamp pieces 62.

In an embodiment, as shown in FIGS. 16 and 17, the tip portions 68 (68a and 68b) of the clamp pieces 62 are configured to overlap each other when viewed from the direction perpendicular to the plane P in the closed state.

According to this embodiment, it is possible to close the tip portions of the clamp pieces 62 each other before the pair of clamp pieces 62 are set in the closed state, and thus to prevent the bone-in limb meat W from falling from the tip sides of the clamp pieces.

In the embodiment shown in FIG. 16, the pair of tip portions 68 (68a and 68b) are disposed to be offset in the direction perpendicular to the plane P. Thus the tip portions 68 (68a and 68b) can overlap each other.

Figure 19:
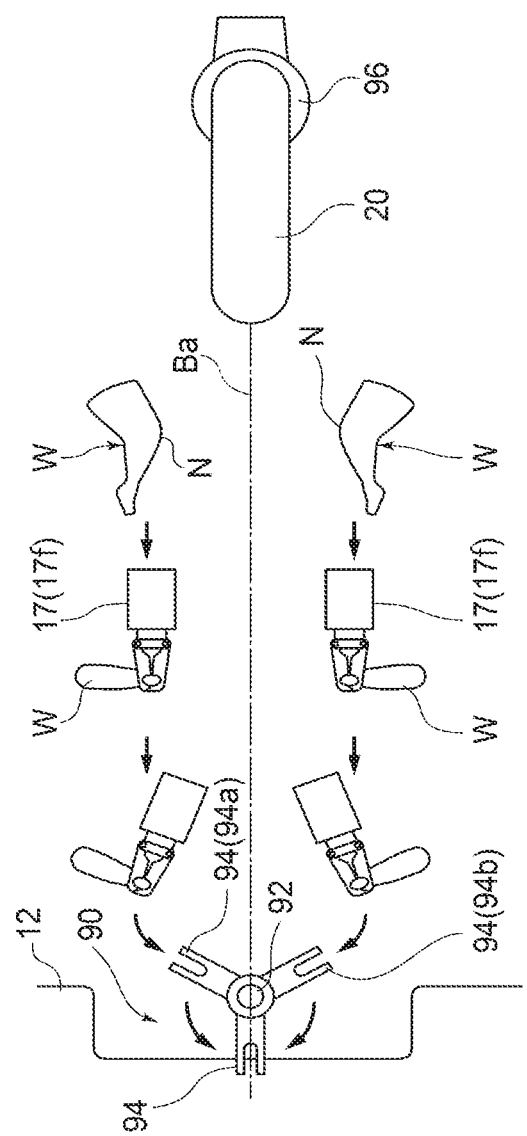
FIG. 19 is an explanatory view showing a loading operation to a loader portion of a loading device according to an embodiment.
Figure 20:
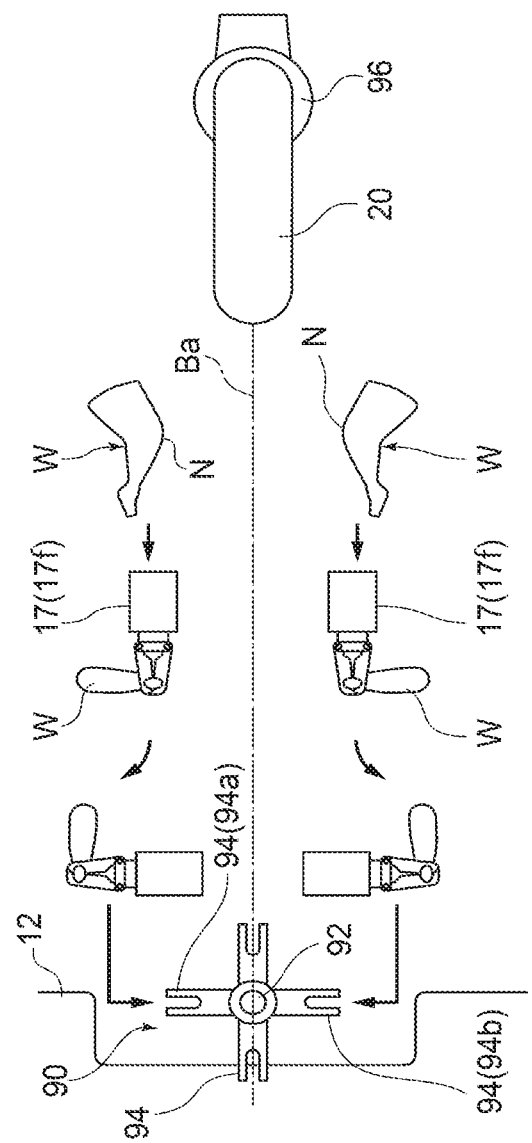
FIG. 20 is an explanatory view showing the loading operation to the loader portion of the loading device according to an embodiment.

In an embodiment, as shown in FIGS. 19 and 20, a loader portion 90 is provided for receiving the bone-in limb meat W from the tip tool 17 (17f) and passing the bone-in limb meat W to the processing portion 12. The loader portion 90 includes a rotatable shaft 92, and three or more hangers 94 being rotatable about the rotatable shaft 92 and disposed at regular angular intervals with respect to the rotatable shaft 92.

According to this embodiment, when suspending the bone-in limb meat W from the tip tool 17 (17f) to the hanger 94 of the loader portion 90, it is possible to simplify the operations of the arm 20 and tip tool 17 (17f) by selecting, based on the orientation information of the bone-in limb meat W obtained by the image processing portion 16, the hanger 94 to suspend. Thus it is possible to increase a suspension speed to the hanger 94 or increase a loading speed at which the bone-in limb meat W is loaded to the processing portion 12.

Figure 21:
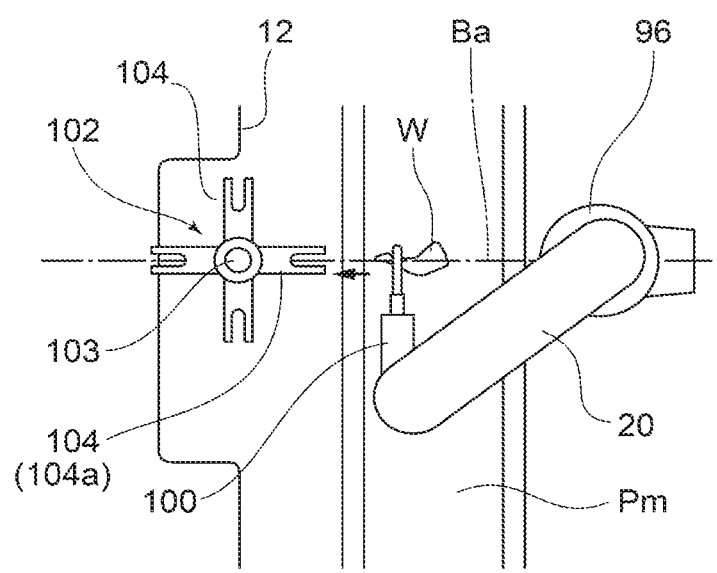
FIG. 21 is an explanatory view showing a loading operation to a loader portion of a loading device, which is a comparative example.

An embodiment shown in each of FIGS. 19 and 20 describes the operations of the arm 20 and tip tools 17 (17f) by the control portion 22 when the tip tools 17 suspend the bone-in limb meats W from the holding surface Pm to the hangers 94. FIG. 21 shows operations of an arm 20 and tip tool 17 (17f), which is a comparative example.

In an embodiment, as shown in FIGS. 19 and 20, the control portion 22 is configured to perform control so as to suspend the bone-in limb meat W from the tip tool 17 (17f) to the hanger 94 on one side with respect to a reference line Ba which connects the rotatable shaft 92 and a base 96 rotatably supporting the arm 20 when the image processing portion 16 determines that the upper surface of each bone-in limb meat W is the front surface, and suspend the bone-in limb meat W from the tip tool 17 (17f) to the hanger 94 on the other side with respect to the reference line Ba when the image processing portion 16 determines that the upper surface of the bone-in limb meat W is the back surface.

In the embodiment shown in FIG. 19, the three hangers 94 are mounted to the rotatable shaft 92 at regular intervals of 120°. In the embodiment shown in FIG. 20, the four hangers 94 are mounted to the rotatable shaft 92 at regular angular intervals of 90°. For example, when the upper surface of the bone-in limb meat W is the front surface, the tip tool 17 (17f) holds the bone-in limb meat W and suspends it to the hanger 94 (94a), and when the upper surface of the bone-in limb meat W is the back surface, the tip tool 17 (17f) holds the bone-in limb meat W and suspends it to the hanger 94 (94b).

In this way, it is possible to simplify the operations of the arm 20 and tip tools 17 (17f), and thus to increase the suspension speed to the hangers 94 or the loading speed to the processing portion 12. That is, it is possible to suspend the bone-in limb meats W to the hangers 94 without significantly changing the angle of the arm 20 with respect to the reference line Ba and the angle of the clamp pieces 62 with respect to the arm 20. As shown in FIG. 19, each of the bone-in limb meats W has different directions of the knee part N depending on whether the upper surface is the front surface or the back surface. The different directions of the knee part N can be canceled by suspending the bone-in limb meats W to the hangers 94 at different positions across the reference line Ba, making it possible to simplify the movements of the arm 20 and tip tools 17 (17f).

For example, in the embodiment shown in FIG. 19, it is possible to suspend the bone-in limb meats to the hangers 94 just by inclining the tip tools 17 (17f) by 30° with respect to the reference line Ba. In the embodiment shown in FIG. 20, it is possible to suspend the bone-in limb meats to the hangers 94 just by inclining the tip tools 17 (17f) by 90° with respect to the reference line Ba. In addition, when loading the bone-in limb meat W suspended to each hanger 94 to the processing portion 12, the hanger 94 only need to be rotated by 120° in FIG. 19 and 90° in FIG. 20, making it possible to reduce a rotation time of the hanger 94. It is therefore possible to increase the suspension speed and the loading speed, and increase a processing amount. In order to obtain the above rotation angles, the control portion 22 needs to perform control to rotate the hanger 94 (94a) forward and rotate the hanger 94 (94b) backward.

In contrast, in the comparative example shown in FIG. 21, a rotatable shaft 103 of a loader portion 102 is disposed on a reference line Ba and, for example, two or four hangers 104 are equiangularly disposed on the rotatable shaft 103. A tip tool 100 always suspends a bone-in limb meat W on a holding surface Pm (for example, a conveyor conveyance surface) to a front hanger 104 (104a) which is positioned on the reference line Ba without a distinction of whether the upper surface of the bone-in limb meat W is the front surface or the back surface. At this time, as shown in FIG. 21, it is necessary to significantly change the angle of the arm 20 with respect to the reference line Ba and the angle of the tip tool 100 with respect to the arm 20. In addition, when loading the bone-in limb meat W suspended to each hanger 104 to a processing portion 12, it is necessary to rotate the hanger 104 by 180°. Therefore, as compared with the above embodiment, a suspension speed and loading speed per bone-in limb meat may increase.

In each of FIGS. 19 and 20, the loader portion 90 is disposed between the tip tools 17 (17f) and the processing portion 12. Instead of the processing portion 12, however, the hanger conveyors 28 where the plurality of hangers 26 are conveyed may be disposed as shown in FIG. 1, and the loader portion 90 may be used to displace the bone-in limb meats W from the tip tools 17 to the plurality of hangers 26.

The bone-in limb meats W include general bone-in limb meats of feet, arms, and the like of livestock such as not only poultry but also a pig, cattle, and sheep.

INDUSTRIAL APPLICABILITY

According to an embodiment, when loading a bone-in limb meat to a processing device such as a deboner, it is possible to automate, by a machine without manpower, a work to load a plurality of bone-in limb meats in the same direction.

REFERENCE SIGNS LIST 10 (10A, 10B, 10a, 10b) Loading system
10a Left-limb-only line
10b Right-limb-only line
12 (12a, 12b) Processing portion
14 (14a, 14b) Image capturing portion
16 Image processing portion
17 (17a, 17b, 17c, 17d, 17e, 17f) Tip tool
18 (18a, 18b), 19 (19a, 19b), 62 (62a, 62b) Clamp piece
19 (19a) First clamp piece
19 (19b) Second clamp piece
20 (20a, 20b) Arm
21 Arm driving portion
22 (22a, 22b) Control portion
24 (24a, 24b) Conveyor
26, 94 (94a, 94b), 104 Hanger
28 (28a, 28b) Hanger conveyor
30 Recess portion
32 Loading portion
34 (34a, 34b) Orientation adjusting member
36 (36a, 36b) Inclined surface
38 Restraint surface
40 Base portion
41, 44 Shaft
42 Opening/closing driving portion
43 Rotation driving portion
46 Mounting portion
48 Extension portion
50, 66 Rotation suppressing portion
50a First rotation suppressing portion
50b Second rotation suppressing portion
52 Projection portion
54 Abutting portion
56a First support wall
56b Second support wall
58 Inversion driving portion
66 Rotation suppressing portion
68 (18a, 18b) Tip portion
70 Actuator
72 Intake port
74, 76 Shaft
78 Mounting plate
80 Contact piece
82 Wall portion
82a First wall portion
82b Second wall portion
82c Third wall portion
92, 103 Rotatable shaft
96 Base
A-A' Contact position
B-B' Holding position
Ba Reference line
C Center line
Cb Holding center
G Gravity center
Mr Rotational moment
N Knee part
Center point
P Plane
S Space
$S_1$ First space
$S_2$ Second space
W Bone-in limb meat
W (L) Left limb
W (R) Right limb
d Depression
f Limb neck part
Pm Holding surface
t Thigh section
$\alpha_2, \alpha_3$ Inclination angle

The invention claimed is:

1. A loading system for loading a bone-in limb meat to a processing portion, the loading system comprising:
an image capturing portion for capturing an image of the bone-in limb meat before being loaded to the processing portion;
an image processing portion capable of acquiring orientation information of the bone-in limb meat from the image of the bone-in limb meat captured by the image capturing portion;
a tip tool for holding the bone-in limb meat;
an arm supporting the tip tool, and capable of controlling a position and orientation of the tip tool; and
a control portion controlling, based on the orientation information acquired by the image processing portion, at least an operation of the arm and thereby holding a limb neck part of the bone-in limb meat, and loading the bone-in limb meat to the processing portion in a predetermined direction.

2. The loading system for the bone-in limb meat according to claim 1,
wherein the orientation information includes front/back surface information indicating whether an upper surface of the bone-in limb meat, the image of which is captured by the image capturing portion, is a front surface or a back surface, and
wherein the control portion is configured to control, based on the orientation information including the front/back surface information, at least the operation of the arm so as to load the bone-in limb meat to the processing portion.

3. The loading system for the bone-in limb meat according to claim 1, further comprising: a conveyor conveying the bone-in limb meat to the processing portion,
wherein the image capturing portion is configured to capture the image of the bone-in limb meat conveyed by the conveyor.

4. The loading system for the bone-in limb meat according to claim 1,
wherein the loading system only loads one of a right limb or a left limb of the bone-in limb meat to the processing portion.

5. The loading system for the bone-in limb meat according to claim 1, further comprising: a loader portion for receiving the bone-in limb meat from the tip tool and passing the bone-in limb meat to the processing portion, wherein the loader portion includes a rotatable shaft, and three or more hangers being rotatable about the rotatable shaft and disposed at regular angular intervals with respect to the rotatable shaft.

6. The loading system for the bone-in limb meat according to claim 5,
wherein the control portion is configured to perform control so as to suspend the bone-in limb meat from the tip tool to the hanger on a first side with respect to a reference line when the upper surface of the bone-in limb meat, the image of which is captured by the image capturing portion, is the front surface, the reference line connecting the rotatable shaft and a base movably supporting the arm, and suspend the bone-in limb meat from the tip tool to the hanger on a second side with respect to the reference line when the upper surface of the bone-in limb meat, the image of which is captured by the image capturing portion, is the back surface.

7. The loading system for the bone-in limb meat according to claim 1,
wherein the tip tool includes:
a base portion supported by the arm;
a pair of clamp pieces mounted to the base portion and configured to hold a bone-in limb meat; and
an orientation adjusting member for adjusting an orientation of the bone-in limb meat, the orientation adjusting member being mounted to the base portion independently of the pair of clamp pieces and having an inclined surface inclined at an acute angle with respect to a center line between the pair of clamp pieces, and
wherein, when the pair of clamp pieces are in an opened state, in a planar view, at least a part of the inclined surface of the orientation adjusting member is disposed so as to overlap a space formed between the pair of clamp pieces.

8. The loading system for the bone-in limb meat according to claim 1,
wherein the tip tool includes:
a pair of clamp pieces including a first clamp piece and a second clamp piece, and being openable/closable so as to hold a bone-in limb meat; and
a rotation suppressing portion for suppressing a rotation of the bone-in limb meat, the rotation suppressing portion being disposed at a position deviated with respect to the pair of clamp pieces in a direction perpendicular to a plane including an opening/closing direction of the pair of clamp pieces, and
wherein the rotation suppressing portion includes a projection portion disposed so as to protrude from the first clamp piece into a space between the pair of clamp pieces and configured to contact the bone-in limb meat when viewed from the direction perpendicular to the plane.

9. The loading system according to claim 1,
wherein the tip tool includes:
a pair of clamp pieces for holding a bone-in limb meat;
a support portion openably/closably supporting the pair of clamp pieces at respective base portions of the clamp pieces; and
rotation suppressing portions for suppressing a rotation of the bone-in limb meat, the rotation suppressing portions being respectively disposed so as to protrude from surfaces of the pair of clamp pieces along a direction perpendicular to a plane including opening/closing directions of the pair of clamp pieces,
wherein in an opened state of the pair of clamp pieces, the pair of clamp pieces respectively have tip portions at positions closer to a center line between the pair of clamp pieces than the rotation suppressing portions and positions farther away from the support portion than the rotation suppressing portions in a direction along the center line.

* * * * *